(12) United States Patent
Garimella et al.

(10) Patent No.: US 11,023,749 B2
(45) Date of Patent: Jun. 1, 2021

(54) PREDICTION ON TOP-DOWN SCENES BASED ON ACTION DATA

(71) Applicant: Zoox, Inc., Foster City, CA (US)

(72) Inventors: Gowtham Garimella, Baltimore, MD (US); Marin Kobilarov, Mountain View, CA (US); Andres Guillermo Morales Morales, San Francisco, CA (US); Kai Zhenyu Wang, Foster City, CA (US)

(73) Assignee: Zoox, Inc., Foster City, CA (US)

(*) Notice: Subject to any disclaimer, the term of this patent is extended or adjusted under 35 U.S.C. 154(b) by 51 days.

(21) Appl. No.: 16/504,147

(22) Filed: Jul. 5, 2019

(65) Prior Publication Data

US 2021/0004611 A1 Jan. 7, 2021

(51) Int. Cl.
*G06K 9/00* (2006.01)
*G06K 9/62* (2006.01)
(Continued)

(52) U.S. Cl.
CPC ..... *G06K 9/00798* (2013.01); *G05B 13/0265* (2013.01); *G06K 9/6256* (2013.01);
(Continued)

(58) Field of Classification Search
CPC ......... G05D 1/0088; G05D 2201/0213; G05D 1/0221; B60W 30/0956; G06K 9/00805;
(Continued)

(56) References Cited

U.S. PATENT DOCUMENTS

| 2017/0369052 A1 | 12/2017 | Nagy et al. |
| 2020/0159225 A1* | 5/2020 | Zeng ............ G05D 1/0088 |
| 2020/0174481 A1* | 6/2020 | Van Heukelom .... G05D 1/0088 |

FOREIGN PATENT DOCUMENTS

| DE | 102016218549 B3 | 12/2017 |
| JP | 2019001450 A | 1/2019 |
| WO | WO2018172849 A1 | 9/2018 |

OTHER PUBLICATIONS

Bahari et al., "Feed-Forwards Meet Recurrent Networks in Vehicle Trajectory Prediction", 19th Swiss Transport Research Conf, May 2019, 13 pgs.
(Continued)

*Primary Examiner* — Charlotte M Baker
(74) *Attorney, Agent, or Firm* — Lee & Hayes, P.C.

(57) ABSTRACT

Techniques for determining predictions on a top-down representation of an environment based on vehicle action(s) are discussed herein. Sensors of a first vehicle (such as an autonomous vehicle) can capture sensor data of an environment, which may include object(s) separate from the first vehicle (e.g., a vehicle or a pedestrian). A multi-channel image representing a top-down view of the object(s) and the environment can be generated based on the sensor data, map data, and/or action data. Environmental data (object extents, velocities, lane positions, crosswalks, etc.) can be encoded in the image. Action data can represent a target lane, trajectory, etc. of the first vehicle. Multiple images can be generated representing the environment over time and input into a prediction system configured to output prediction probabilities associated with possible locations of the object (s) in the future, which may be based on the actions of the autonomous vehicle.

20 Claims, 11 Drawing Sheets

(51) Int. Cl.

| | |
|---|---|
| *G08G 1/04* | (2006.01) |
| *G08G 1/01* | (2006.01) |
| *G06T 11/60* | (2006.01) |
| *G08G 1/052* | (2006.01) |
| *G08G 1/056* | (2006.01) |
| *G05B 13/02* | (2006.01) |

(52) U.S. Cl.
CPC ............ *G06T 11/60* (2013.01); *G08G 1/0112* (2013.01); *G08G 1/0145* (2013.01); *G08G 1/04* (2013.01); *G08G 1/052* (2013.01); *G08G 1/056* (2013.01); *G06T 2210/12* (2013.01)

(58) Field of Classification Search
CPC ........... G06K 9/00785; G06K 9/00791; G06K 2209/23; G06K 9/00832; A61B 5/18; B60R 21/01538; G01C 21/3602; G06T 2207/30236; G06T 2207/30248; G06T 2207/30252; G06T 2207/30261; G06T 2207/30264; G06T 2207/30256; G06T 2207/30268
USPC ........................................................ 382/104
See application file for complete search history.

(56) References Cited

OTHER PUBLICATIONS

Bansal et al., "ChauffeurNet: Learning to Drive by Imitating the Best and Synthesizing the Worst", Robotics: Science and Systems, Jun. 2019, 20 pgs.
Casas et al., "IntentNet: Learning to Predict Intention from Raw Sensor Data", Proceedings of The 2nd Conference on Robot Learning, Oct. 2018, 10 pgs.
Chandra et al., "TraPhic: Trajectory Prediction in Dense and Heterogeneous Traffic Using Weighted Interactions", IEEE/RSJ Intl Conf on Intelligent Robots and Systems, Nov. 2019, 10 pgs.
Demiris, "Prediction of Intent in Robotics and Multi-Agent Systems", Cognitive Processing, Sep. 2017, vol. 8, Issue 3, 8 pgs.
Deo et al., "Convolutional Social Pooling for Vehicle Trajectory Prediction", The IEEE Conference on Computer Vision and Pattern Recognition (CVPR) Workshops, 2018, May 2018, 9 pgs.
Deo et al., "How Would Surround Vehicles Move? A Unified Framework for Maneuver Classification and Motion Prediction", IEEE Transactions on Intelligent Vehicles, vol. 3, Issue: 2, Jun. 2018, 12 pgs.
Deo et al., "Multi-Modal Trajectory Prediction of Surrounding Vehicles with Maneuver Based LSTMs", 2018 IEEE Intelligent Vehicles Symposium, Jun. 2018, 6 pgs.
Ding et al., "A New Multi-Vehicle Trajectory Generator to Simulate Vehicle-to-Vehicle Encounters", 2019 Intl Conf on Robotics and Automation, May 2019, 7 pgs.
Ding et al., "Predicting Vehicle Behaviors Over an Extended Horizon Using Behavior Interaction Networks", International Conference on Robotics and Automation (ICRA), May 2019, 7 pgs.
Gupta et al., "Social GAN: Socially Acceptable Trajectories with Generative Adversarial Networks", CVPR, Jun. 2018, 10 pgs.
Huang et al., "Uncertainty-Aware Driver Trajectory Prediction at Urban Intersections", 2019 Intl Conf on Robotics and Automation, May 2019, 8 pgs.
Hubmann et al., "Automated Driving in Uncertain Environments: Planning with Interaction and Uncertain Maneuver Prediction", IEEE Transactions on Intelligent Vehicles, vol. 3, Issue 1, Mar. 2018, 13 pgs.
Kuefler et al., "Imitating Driver Behavior with Generative Adversarial Networks", 2017 IEEE Intelligent Vehicles Symposium, Jun. 2017, 8 pgs.
Lee et al., "DESIRE: Distant Future Prediction in Dynamic Scenes with Interacting Agents", CVPR Apr. 2017, 10 pgs.
Lefevre et al., "A Survey on Motion Prediction and Risk Assessment for Intelligent Vehicles", Robomech Journal, Jul. 2014, 14 pgs.
Li et al., "Coordination and Trajectory Prediction for Vehicle Interactions via Bayesian Generative Modeling", 2019 IEEE Intelligent Vehicles Symposium, Jun. 2019, 8 pgs.
Li et al., "Interaction-Aware Multi-Agent Tracking and Probabilistic Behavior Prediction via Adversarial Learning", 2019 International Conference on Robotics and Automation, May 2019, 7 pgs.
Luo et al., "Fast and Furious: Real Time End-to-End 3D Detection, Tracking and Motion Forecasting with a Single Convolutional Net", 2018 IEEE/CVF Conference on Computer Vision and Pattern Recognition, Jun. 2018, 9 pgs.
Maye et al., "Bayesian On-Line Learning of Driving Behaviors", IEEE International Conference on Robotics and Automation (ICRA), May 2011, 6 pgs.
Rhinehart et al., "PRECOG: Prediction Conditioned on Goals in Visual Multi-Agent Settings", ICML 2019 Workshop on AI for Autonomous Driving, Jun. 2019, 20 pgs.
Rhinehart et al., "R2P2: A ReparameteRized Pushforward Policy for Diverse, Precise Generative Path Forecasting", ECCV, Sep. 2018, 17 pgs.
Sadeghian et al., "CAR-Net: Clairvoyant Attentive Recurrent Network", European Conf on Computer Vision, Oct. 2018, 17 pgs.
Santana et al., "Learning a Driving Simulator", arXiv: 1608.01230, Aug. 2016, 8 pgs.
Sarkar et al., "Trajectory Prediction of Traffic Agents at Urban Intersections Through Learned Interactions", IEEE 20th Intl Conf on Intelligent Transportation Systems, Oct. 2017, 8 pgs.
Suo et al., "End-to-End Interpretable Neural Motion Planner", CVPR Jun. 2019, 10 pgs.
Tran et al., "Online Maneuver Recognition and Multimodal Trajectory Prediction for Intersection Assistance using Non-Parametric Regression", IEEE Intelligent Vehicles Symposium, Jun. 2014, 6 pgs.
Zhao et al., "Multi-Agent Tensor Fusion for Contextual Trajectory Prediction", 2019 Conf on Computer Vision and Pattern Recognition, Jun. 2019, 9 pgs.
Zyner et al., "Naturalistic Driver Intention and Path Prediction using Recurrent Neural Networks", IEEE Transactions on Intelligent Transportation Systems, Oct. 2019, 10 pgs.
The PCT Search Report and Written Opinion dated Oct. 1, 2020 for PCT Application No. PCT/US2020/040713, 9 pages.

\* cited by examiner

PREDICTION ON TOP-DOWN SCENES BASED ON ACTION DATA

BACKGROUND

Prediction techniques can be used to determine future states of entities in an environment. That is, prediction techniques can be used to determine how a particular entity is likely to behave in the future. Current prediction techniques often involve physics-based modeling or rules-of-the-road simulations to predict future states of entities in an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
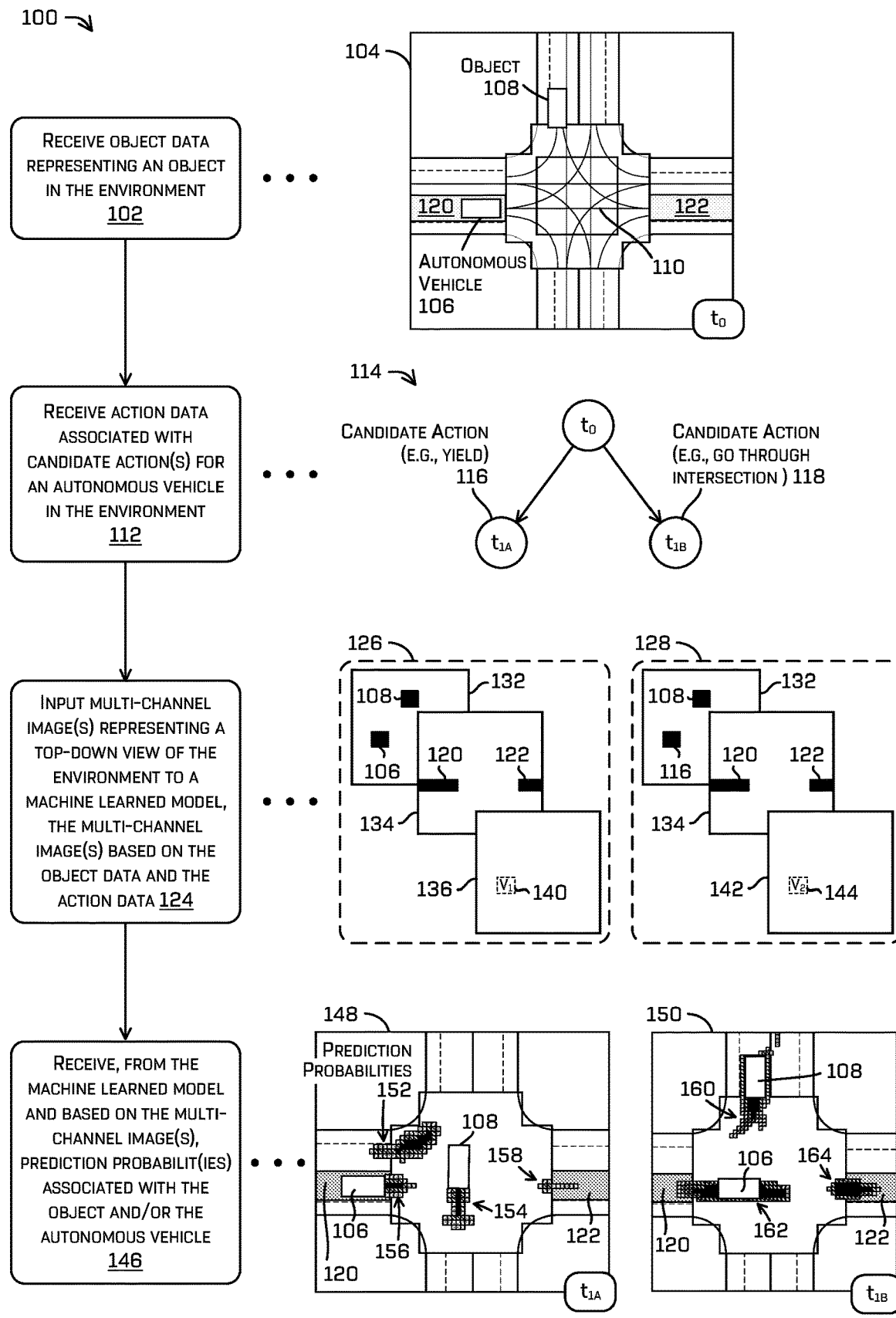
FIG. 1 is a pictorial flow diagram of an example process for receiving object data and action data, inputting a multi-channel image representing the environment into a machine learned model, and receiving prediction probabilities based on the object data and the action data, in accordance with examples of the disclosure.

Techniques for determining predictions based on a top-down representation of an environment and vehicle action(s) are discussed herein. Sensors of a first vehicle (such as an autonomous vehicle) can capture sensor data of an environment, which may include object(s) separate from the vehicle, such as a second vehicle or a pedestrian. A multi-channel image (which may be referred to throughout as simply an image) encoding various parameters of the object(s) and/or of the environment in a top-down view can be generated based on the sensor data, map data, and/or action data. Sensor data can be used to generate one or more channels of the multi-channel image representing a bounding box and velocity information associated with the object, map data, and other semantic information (e.g., speed limits, lane widths, lane ends, stop lines, traffic lights, traffic light states, and the like). Action data can be used to generate one or more channels of the multi-channel image representing a target lane, trajectory, etc. of the first vehicle (which may, for example, correspond to actions including the vehicle proceeding through an intersection, changing lanes, making a turn, or the like). Multiple images can be generated representing the environment over time and input into a prediction system configured to output prediction probabilities associated with possible locations of the object(s) in the future. The prediction probabilities can be generated or determined based on particular candidate actions, and the prediction probabilities can be evaluated to select or determine a candidate action to control the autonomous vehicle.

Autonomous driving in dense urban environments is challenging due to the complex reasoning that is often used to resolve multi-way interactions between objects. This reasoning can be time critical and can be constantly evolving. Techniques described herein are directed to scenarios during driving, which may include but are not limited to urban intersections without traffic lights. At these junctions, multiple objects (vehicle, pedestrians, bicyclists, etc.) are often competing for the same shared space, making it useful to predict the intent of objects in order to successfully navigate the intersection. Techniques discussed herein are directed to predicting the driving behavior of objects traversing through the junction given several snapshots of the history of the environment. Some techniques use a semantic-segmentation style approach to formulate a deep Convolutional Neural Network (CNN) architecture that can predict the future as prediction probabilities (e.g., a heat map), as discussed herein.

In some examples, prediction probabilities associated with objects may not be limited to a Gaussian distribution over a distinct set of maneuvers, but instead may comprise a heat map indexed over time of where the objects will be in future (e.g., with an arbitrary distribution). In some examples, an intensity of the heat map may represent a probability that a cell or pixel will be occupied by any object at the specified instance in time (e.g., an occupancy grid). In some instances, the heat map may capture both an arbitrary trajectory distribution per object, as well as a distribution over distinct maneuvers (e.g., candidate actions) without using explicit maneuver specification. In some examples, this approach naturally collapses many future modes into a single heat map. In some examples, a number of signals about an intent of an autonomous vehicle can be used to resolve this multi-modality. In such examples (e.g., where conditioned on an action intent), such heat maps may comprise more tightly clustered probability distributions.

For a vehicle (e.g., an autonomous vehicle or an autonomous robot) to drive safely through an intersection, it should reason about the behavior of other objects in the world. In an example discussed below in connection with FIG. 1, an autonomous vehicle may traverse through an intersection. The autonomous vehicle can pass through the junction safely if it can infer whether to yield to an oncoming object or not. In some examples, the techniques discussed herein may include conditioning the prediction probabilities (e.g., the heat map) on the intent (represented as action data) of the autonomous vehicle. By conditioning the heat map on the intent of the autonomous vehicle, techniques discussed herein can include minimizing the multi-modality of the predicted heat map. That is, the predictions of objects in an environment can be based on candidate actions proposed to be performed by the autonomous vehicle and such predictions may comprise improved predictions with respect to the additional objects. The output of a machine learned model can be used by a planning system to determine a cost function based on the heat map output and search for the optimal action for the autonomous vehicle that minimizes the cost on the heat map output.

As noted above, techniques can include generating a plurality of multi-channel images representing the environment over time. The image or the plurality of images can be input into a prediction system (e.g., a machine learned model) configured to output prediction probabilities associated with possible locations of the object in the future. Prediction probabilities can be associated with a candidate action of plurality of candidate actions. Individual candidate actions can be evaluated to determine a risk, cost, and/or reward associated with the candidate action, and a candidate action can be selected or determined based at least in part on evaluating the candidate actions. The autonomous vehicle can be controlled based at least in part on a selected or determined candidate action.

Sensor data captured by the autonomous vehicle can include lidar data, radar data, image data, time of flight data, sonar data, and the like. In some cases, the sensor data can be provided to a perception system configured to determine a type of an object (e.g., vehicle, pedestrian, bicycle, animal, parked car, tree, building, and the like) in the environment. Further, the perception system can determine, based on the sensor data, movement information about the object in the environment. The sensor data and any data based on the sensor data can be represented in a top-down view of the environment. For example, the image can represent the object as a two-dimensional bounding box representing the location of the object in the environment as well as an extent of the object (e.g., the length and width of the object), and a classification of the object (e.g., vehicle, pedestrian, and the like). Movement information such as velocity information can be represented as a velocity vector associated with the bounding box, although other representations are contemplated.

In some cases, the image to be input into the prediction system can be represented by individual channels of a multichannel image where each channel represents different information about the object and the environment in which the object is located. For example, channels may represent, but are not limited to, one or more of: road network information (e.g., semantic labels indicating lanes, crosswalks, stop lines, lane dividers, stop signs, intersections, traffic lights, and the like) which may be determined based on the sensor data or otherwise received/encoded in map data available to the system, traffic light status (e.g., red light, yellow light, green light, etc.), a bounding box associated with the object, a velocity of the object in an x-direction and a y-direction, an acceleration of the object in an x-direction and a y-direction, a blinker status of the object (e.g., left-turn, right-turn, braking, reverse, hazards, no lights, etc.), and the like.

In some examples, a planning system can generate or otherwise determine one or more candidate actions for the autonomous vehicle to perform in the environment. For example, a first candidate action may include staying in a current lane, while a second candidate action may include changing lanes to the left or the right of the current lane. By way of another example, a third candidate action may include traversing through a junction, while a fourth candidate action may include tuning left or right at the junction. In some examples, a candidate action can be represented in a multi-channel image as highlighting, illustrating, annotating, or otherwise indicating a target lane or candidate trajectory for the vehicle to follow in the environment.

In some examples, a candidate action may be associated with one or more sub-goals. For example, a sub-goal may comprise velocity information or acceleration information, such as a target velocity or acceleration, an average velocity or acceleration, a maximum or minimum velocity or acceleration, and the like. In some examples, a sub-goal may include, but is not limited to, steering angles, distance(s) from object(s), distance(s) from a reference line, and the like. In some examples, a sub-goal can be represented as a channel of the multi-channel image.

In some examples, the plurality of channels can be input to the prediction system to generate prediction probabilit(ies). In some examples, the image can be input directly to the prediction system (e.g., without generating a plurality of channels based on the image) to generate the prediction probabilit(ies).

In some examples, the number of channels may be reduced into fewer channels. As a non-limiting example, a simple 3-channel (e.g., RGB) image may be used to represent multiple pieces of semantic information. In such an example, a red channel, for instance, may be used to denote a bounding box and the intensity of the red value may be associated with a velocity, acceleration, or the like. In such an example, a second channel may encode lane width with intensity indicative of a speed limit, and the like. Further, in such an example, a third channel may encode a candidate action by identifying a target lane associated with a particular candidate action.

In some examples, the prediction system can include a machine learned model trained to output data that can be used to generate one or more predicted trajectories. For example, the machine learned model can output coordinates (e.g., x-coordinates and y-coordinates) associated with the object (e.g., a third-party vehicle) at one or more times in the future (e.g., 1 second, 2 seconds, 3 seconds, etc.). In some examples, the machine learned model can output coordinates associated with the object as well as probability information associated with each coordinate. In some examples, the machine learning model can include a convolutional neural network (CNN), which may include one or more recurrent neural network (RNN) layers, such as, but not limited to, long short-term memory (LSTM) layers. In some examples, the machine learning model can output a heat map associated with prediction probabilities. In some examples, at least one predicted trajectory can be determined based at least in part on the heat map.

A heat map can represent a discretized region of the environment proximate to the autonomous vehicle. For example, the heat map can represent a 64×64 grid (or J×K sized grid) representing a 100 meter by 100 meter region around the autonomous vehicle. Of course, the heat map can represent any size of region and can represent any number of discrete portions of the region. In some cases, a portion of the heat map can be referred to as a cell of the heat map. Each cell can comprise a prediction probability representing a probability that the object will be at the corresponding location in the environment at the time corresponding to the heat map. In some instances, the machine learned model can output a plurality of heat maps, wherein a heat map of the plurality of heat maps can represent probability predictions associated with the environment (e.g., the object and/or the autonomous vehicle) at a particular time in the future (e.g., 0.5 second, 1 second, 3 seconds, 5 seconds, 10 seconds, etc.).

In some instances, one or more heat maps can be provided to a planning system instead of or in addition to the at least one predicted trajectory.

In some examples, the techniques discussed herein can include generating possible scenarios as one or more probabilistic maps that account for interactions and produces interpretable marginal costs for tree search. In some examples, the techniques include conditioning on an intent of the autonomous vehicle through network inputs (e.g., as one or more channels of a multi-channel image without constraining the trajectory of the autonomous vehicle. Further, aspects of the disclosure include a machine learned algorithm (e.g., a convolutional neural network) that can predict the future states of the objects around the autonomous vehicle as well as the autonomous vehicle itself as a heat map stacked across time. As noted above, heat maps (or prediction probabilities) output from a machine learned model can be conditioned on one or more candidate actions of the autonomous vehicle. Further, techniques can include discretizing the intent of the autonomous vehicle into goals and sub-goals allowing a planning stem to search for a best (or optimal) candidate action for the autonomous vehicle. Further, aspects of this disclosure include data illustrating different types of interactions between an autonomous vehicle and other objects in an environment.

The techniques discussed herein can improve a functioning of a computing device in a number of additional ways. In some cases, representing the environment and the object(s) in the environment as a top-down view can represent a simplified representation of the environment for the purposes of generating prediction probabilit(ies) and/or selecting between candidate actions. In some cases, the image can represent the environment without extracting particular features of the environment, which may simplify the generation of the prediction system and subsequent generation of at least one predicted trajectory. In some cases, evaluating prediction probabilities may allow the autonomous vehicle to generate more accurate and/or safer trajectories for the autonomous vehicle to traverse an environment. For example, prediction probabilities associated with a first candidate action can be evaluated to determine a likelihood of a collision or a near-collision and may allow the autonomous vehicle to select or determine another candidate action (e.g., change lanes, stop, etc.) in order to safely traverse the environment. In at least some examples described herein, conditioning predictions based on top-down encodings of the environment in addition to an intended action may minimize (improve) a spread of a probability distribution function associated with the object, yielding safer decision-making of the system. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication of whether it is safe to perform various maneuvers. In another example, the techniques can be utilized in an aviation or nautical context, or in any system involving objects or entity that may be associated with behavior that is unknown to the system. Further, sensor data can include any two-dimensional, three-dimensional, or multi-dimensional data such as image data (e.g., stereo cameras, time-of-flight data, and the like)), lidar data, radar data, sonar data, and the like. Additionally, the techniques described herein can be used with real data (e.g., captured using sensor(s)), simulated data (e.g., generated by a simulator), or any combination of the two.

FIG. 1 is a pictorial flow diagram of an example process 100 for receiving object data and action data, inputting a multi-channel image representing the environment into a machine learned model, and receiving prediction probabilities based on the object data and the action data, in accordance with examples of the disclosure.

At operation 102, the process can include receiving object data representing an object in the environment. In some examples, the object data can be received from a perception system of an autonomous vehicle. For example, object data can include, but is not limited to, one or more of a bounding box associated with an environment, velocity and/or acceleration information, classification information, and the like. In some examples, the operation 102 can include capturing sensor data of an environment. In some examples, the sensor data can be captured by one or more sensors on an autonomous vehicle. For example, the sensor data can include data captured by one or more of a lidar sensor, a radar sensor, an image sensor, a time of flight sensor, a sonar sensor, and the like. In at least some examples, additional environmental data may be received (e.g., map data of the environment encoding portions such as lanes, reference lines, crosswalks, traffic devices and/or signs, and the like).

An example 104 illustrates an environment in which an autonomous vehicle 106 is traversing the environment. In some examples, the autonomous vehicle 106 can perform the operations of the process 100, which can include capturing the sensor data of the environment. For the purpose of discussion, a vehicle capturing (or utilizing) the sensor data can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle are described throughout this disclosure.

An object 108 is also located in the environment. In some examples, the object 108 can represent a vehicle, a pedestrian, a bicycle, an animal, and the like. The environment illustrated in the example 104 can include a drivable region and a non-drivable region. In some examples, the operation 102 can include localizing the autonomous vehicle 106 in the environment and accessing map data associated with the environment. For example, map data can comprise map elements such lane marking, lane boundaries, one or more lane references 110 (e.g., illustrating a centerline associated with a lane and/or a route between available (e.g., legal) lanes. Additional examples of map elements can include, but are not limited to, one or more of a lane element, a bike lane element, a crosswalk element, an intersection element, a lane divider element, a traffic light element, a stop sign element, a stop line element, a yield sign element, a yield line element, a parking lane element, a driveway element, a speed bump element, jay walking regions (e.g., a virtual crosswalk), trajectory waypoints (e.g., known trajectories), passenger pickup points, a sign location element, a geofence element, and the like.

In some instances, the sensor data captured in the operation 102 can be used to determine information about the object 108, including but not limited to, a type of the object (e.g., semantic information indicating a classification of the object, such as a vehicle, pedestrian, bicycle, animal, and the like). In some instances, the operation 102 can include determining the type of the object 108, a bounding box associated with the object 108, and/or movement information associated with the object, as discussed herein.

At operation 112, the process can include receiving action data associated with candidate action(s) for an autonomous vehicle in the environment. An example 114 illustrates a candidate action 116 (e.g., a first candidate action such as a yield action) and a candidate action 118 (e.g., a second candidate action such as a "go through intersection" action).

That is, the candidate action 116 can include an instruction from a planning system of the autonomous vehicle 106 to yield to the object 108 and to refrain from traversing through the intersection until the object 108 has traversed through the intersection (or some other trigger, such as an elapse of a period of time).

The candidate action 118 can include traversing though the junction illustrated in the example 104 before allowing the object 108 to traverse through the junction.

In some examples, action data can be represented in a variety of manners. In some instances, the example 104 illustrates action data as a current lane 120 and a target lane 122. In some examples, and as discussed herein, information associated with the candidate actions 116 and 118 can be represented via the current lane 120 and/or the target lane 122, as well as a velocity profile and/or an acceleration profile (e.g., a sub-goal).

At operation 124, the process can include inputting multi-channel image(s) representing a top down view of the environment to a machine learned model, the multi-channel image(s) based on the object data and the action data. Examples of such multi-channel image(s) are illustrated in example 126 and 128.

The example 126 represents a first multi-channel image associated with the first candidate action 116. For instance, the example 126 comprises a first channel 132, a second channel 134, and a third channel 136. In some examples, the first channel 132 can represent bounding boxes, locations, extents (e.g., length and width), etc. of the autonomous vehicle 106 and/or the object 108 in the environment. In some examples, the second channel 134 can represent action data associated with the candidate action 116. For example, the second channel 134 can illustrate the current lane 120 and/or the target lane 122 associated with the candidate action 116. In some examples, the third channel 136 can represent additional action data, which in this case, corresponds to velocity information 140 (e.g., $V_1$) associated with the autonomous vehicle 106 implementing the candidate action 116. In some examples, the velocity information 140 can comprise an instantaneous velocity, an average velocity, and the like. For example, as the candidate action 116 is indicative of a yield action, the velocity information 140 can represent a relatively low velocity (or can represent a stopped velocity while the autonomous vehicle 106 yields for the object 108). Although discussed in the context of velocity, the velocity information 140 can represent information associated with an acceleration (e.g., average over the action, maximum acceleration associated with the action, and the like), steering angle, distance(s) from a reference line or obstacle, and the like.

The example 128 represents a second multi-channel image associated with the second candidate action 118. In some examples aspects of the example 128 can be similar to some aspects of the example 126. For example, the example 128 can comprise the first channel 132, the second channel 134, and a third channel 142. In some examples, the third channel can comprise velocity information 144 that may be associated with the second candidate action 118. For example, as the second candidate action 118 may represent the autonomous vehicle 106 traversing through the intersection prior to the object 108, the velocity information 144 (e.g., $V_2$) may represent a higher average velocity (or velocity profile) than the second velocity information 140 associated with the first candidate action 116. As noted above, although discussed in the context of velocity, the velocity information 144 can represent information associated with an acceleration (e.g., average over the action, maximum acceleration associated with the action, and the like), steering angle, distance(s) from a reference line or obstacle, and the like.

Of course, the example 128 may comprise different action data that the action data represented in the second channel 134 in the event the second candidate action 118 represents a different location than the first candidate action 116 (e.g., if the first candidate action 116 represented going straight and the second candidate action 118 represented a left or right turn).

In some instances, encoding an intent of the autonomous vehicle 106 (e.g., via the channel 134 can be provided as partial future information without specifying a precise trajectory for the autonomous vehicle 106. In some examples, the intent can be encoded by 1) painting or otherwise indicating an entering lane (e.g., the current lane 120) and an exiting lane (e.g., the target lane 122); and 2) by providing a discrete blob indicating high and low future average acceleration and velocities (e.g., as the channels 136 and/or 142).

The first intent signal discussed above (e.g., the second channel 134) uses the target lane 122 associated with a particular candidate action. By providing the target lane 122, techniques can remove multi-modal outputs such for each junction exit in favor of one based on a planned trajectory associated with the autonomous vehicle 106.

The second intent as discussed above (e.g., the channels 136 and 142) denote a sub-goal and may include an intended velocity and/or acceleration profile of the autonomous vehicle 106. In some cases, this sub-goal intent provides a discretized value of an average acceleration of the autonomous vehicle 106 in the future up to a specified prediction horizon. In some cases, the sub-goal intents depict what the autonomous vehicle is going to do in the immediate future. For example, high decelerations implies the autonomous vehicle is braking for some other object. High acceleration implies the object is speeding up to cross the junction. Similar intents also apply to the velocity dimension of the autonomous vehicle 106. The intents are designed to remove multi-modal outputs but at the same time not constrain the output of the autonomous vehicle 106 and/or the object 108 to a single trajectory.

As can be understood, the examples 126 and 128 can comprise a plurality of multi-channel images representing the environment at various points in time in the environment. For example, the examples 126 and/or 128 can represent history of the autonomous vehicle 106 and the object 108 (and other objects such as pedestrians and vehicles, etc.) at 0.5 second intervals over the past 4 seconds, although any number of instances and time periods can be used to represent an environment.

In some instances, the examples 126 and/or 128 can include a channel representing auxiliary inputs such as turn indicators, brake lights, hazard lights, and the like for a latest time step (e.g., at time to) and/or over time (e.g., time $t_{-m}$ to time $t_0$). Additional channels may include, but are not limited to, kinematic information (also referred to as kinematic data, motion information, or motion data) of the autonomous vehicle 106 and/or the object 108 (e.g., average velocity or acceleration over a period of time, instantaneous velocity or acceleration at previous time instances, wheel angles, turning rates, yaw, pitch, roll, and the like), semantic information (e.g., a vehicle classification, turn signal indicators, brake light indicators, double parked vehicle indication, and the like), an occlusion grid (e.g., indicating areas of an environment that are not visible to one or more sensors of the autonomous vehicle 106, or areas that are predicted to be occluded, and the like), etc.

As can be understood, the operation 124 can include generating or determining the multi-channel image(s), as discussed herein. Examples of generating or determining multi-channel image(s) are discussed in connection with U.S. patent application Ser. No. 16/151,607, entitled "Trajectory Prediction on Top-Down Scenes," and filed Oct. 4, 2018. Application Ser. No. 16/151,607 is herein incorporated by reference, in its entirety.

At operation 146, the process can include receiving, from the machine learned model and based on the multi-channel image(s), prediction probabilit(ies) associated with the object and or the autonomous vehicle. As can be understood, as the multi-channel image(s) can be based on the action data, as discussed herein, the prediction probabilit(ies) can be based on the action data.

Examples 148 and 150 illustrate outputs of the machine learned model, respectively. In some instances, the examples 148 and 150 include heat maps that can represent (e.g., from a top-down perspective of the environment) the prediction probabilities indicative of a probability that the object 108 will be at the corresponding location in the environment at the time corresponding to a respective heat map and based on a respective candidate action. That is, the example 148 can represent a time $t_{1A}$ after time $t_0$, where the "A" designation corresponds to the first candidate action 116. The example 150 can represent a time $t_{1B}$ after time to, where the "B" designation corresponds to the second candidate action 118. The examples 148 and 150 can represent heat maps and/or prediction probabilities of the autonomous vehicle 106 and/or object 108 in the future. Of course, the heat map examples 148 and 150 can represent the prediction probabilities at any period in time, and are not limited to the express times discussed herein.

The example 148 represents prediction probabilities 152, 154, 156, and 156. In some examples, the prediction probabilities 152 and 154 represent possible locations of the object 108 in the environment based at least in part on the autonomous vehicle 106 executing the first candidate action 116. The prediction probabilities 156 and 158 represent possible locations of the autonomous vehicle 106 conditioned on the action data (e.g., the channels 134 and 136).

The example 150 represents prediction probabilities 160, 162, and 164. In some examples, the prediction probabilities 160 represent possible locations of the object 108 in the environment based at least in part on the autonomous vehicle 106 executing the second candidate action 118. The prediction probabilities 162 and 164 represent possible locations of the autonomous vehicle 106 conditioned on the action data (e.g., the channels 134 and 142).

Further, the process 100 can include evaluating the candidate action and/or controlling the autonomous vehicle 106 based at least in part on the candidate actions. For example, the process 100 can include determining an amount of overlap of a bounding box representing the autonomous vehicle 106 and prediction probabilities associated with the object 108. In some examples, the process can include evaluating a candidate trajectory of the autonomous vehicle 106 to determine an overlap between predicted future motion and the prediction probabilities 156, 158, 162, and/or 164.

Figure 2A:
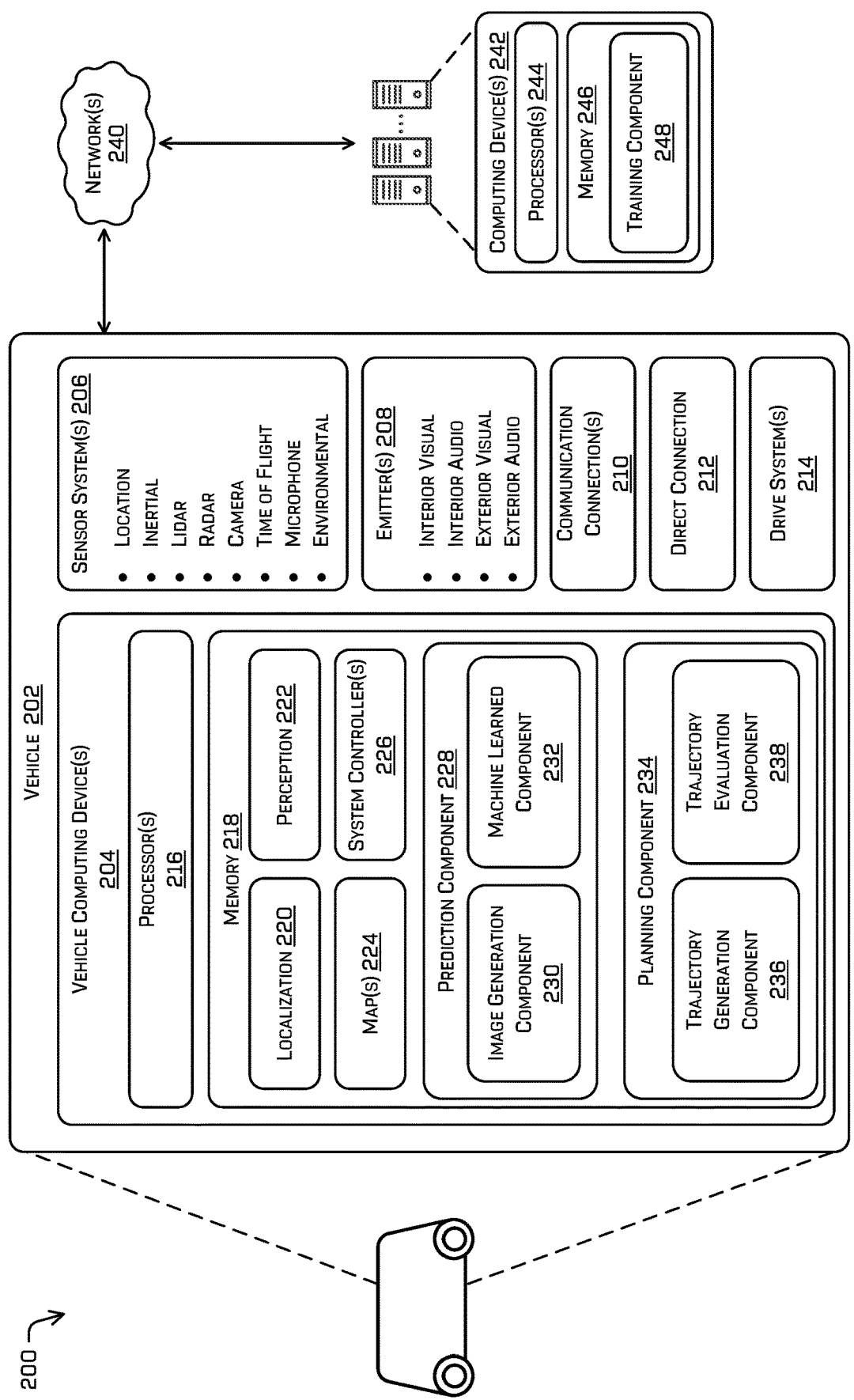
FIG. 2A depicts a block diagram of an example system for implementing the techniques described herein.

FIG. 2A depicts a block diagram of an example system 200 for implementing the techniques described herein. In at least one example, the system 200 can include a vehicle 202.

The vehicle 202 can include one or more vehicle computing devices 204 (also referred to as a vehicle computing device 204 or vehicle computing device(s) 204), one or more sensor systems 206, one or more emitters 208, one or more communication connections 210, at least one direct connection 212, and one or more drive systems 214.

The vehicle computing device 204 can include one or more processors 216 and memory 218 communicatively coupled with the one or more processors 216. In the illustrated example, the vehicle 202 is an autonomous vehicle; however, the vehicle 202 could be any other type of vehicle. In the illustrated example, the memory 218 of the vehicle computing device 204 stores a localization component 220, a perception component 222, one or more maps 224, one or more system controllers 226, a prediction component 228 comprising an image generation component 230 and a machine learned component 232, and a planning component 234 comprising a trajectory generation component 236 and an evaluation component 238. Though depicted in FIG. 2 as residing in memory 218 for illustrative purposes, it is contemplated that the localization component 220, the perception component 222, the one or more maps 224, the one or more system controllers 226, the prediction component 228, the image generation component 230, the machine learned component 232, the planning component 234, the trajectory generation component 236, and the evaluation component 238 may additionally, or alternatively, be accessible to the vehicle 202 (e.g., stored remotely).

In at least one example, the localization component 220 can include functionality to receive data from the sensor system(s) 206 to determine a position and/or orientation of the vehicle 202 (e.g., one or more of an x-, y-, z-position, roll, pitch, or yaw). For example, the localization component 220 can include and/or request/receive a map of an environment and can continuously determine a location and/or orientation of the autonomous vehicle within the map. In some instances, the localization component 220 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 220 can provide data to various components of the vehicle 202 to determine an initial position of an autonomous vehicle for generating a trajectory and/or for generating or receiving map data, as discussed herein.

In some instances, the perception component 222 can include functionality to perform object detection, segmentation, and/or classification. In some examples, the perception component 222 can provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional or alternative examples, the perception component 222 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 218 can further include one or more maps 224 that can be used by the vehicle 202 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 224 can include at least one map (e.g., images and/or a mesh). In some examples, the vehicle 202 can be controlled based at least in part on the map(s) 224. That is, the map(s) 224 can be used in connection with the localization component 220, the perception component 222, the prediction component 228, and/or the planning component 234 to determine a location of the vehicle 202, identify objects in an environment, generate prediction probabilit(ies) associated with objects and/or the vehicle 202, and/or generate routes and/or trajectories to navigate within an environment.

In some examples, the one or more maps 224 can be stored on a remote computing device(s) (such as the computing device(s) 242) accessible via network(s) 240. In some examples, multiple maps 224 can be stored based on, for example, a characteristic (e.g., type of entity, time of day, day of week, season of the year, etc.). Storing multiple maps 224 can have similar memory requirements, but increase the speed at which data in a map can be accessed.

In at least one example, the vehicle computing device 204 can include one or more system controllers 226, which can be configured to control steering, propulsion, braking, safety, emitters, communication, and other systems of the vehicle 202. These system controller(s) 226 can communicate with and/or control corresponding systems of the drive system(s) 214 and/or other components of the vehicle 202.

In general, the prediction component 228 can generate predicted trajectories of objects in an environment. For example, the prediction component 228 can generate one or more predicted trajectories for vehicles, pedestrians, animals, and the like within a threshold distance from the vehicle 202. In some instances, the prediction component 228 can measure a trace of an object and generate a trajectory for the object based on observed and predicted behavior.

In some examples, the image generation component 230 can include functionality to generate images representing a top-down view of a scene. Examples of such images generated by the image generation component 230 are shown in FIG. 1 as the examples 104, 126, and 128.

In some examples, the image generation component 230 can generate an image representing an area around the vehicle 202. In some examples, the area can be based at least in part on an area visible to sensors (e.g., a sensor range), a receding horizon, an area associated with an action (e.g., traversing through an intersection), and the like. In some examples, the image may represent a 100 meter×100 meter area around the vehicle 202, although any area is contemplated. The image generation component 230 can receive data about objects in the environment from the perception component 222 and can receive data about the environment itself from the localization component 220, the perception component 222, and the one or more maps 224. The image generation component 230 can generate a top-down view of the environment including objects in the environment (e.g., represented by a bounding box, as discussed herein), semantic information about the object (e.g., a classification type), movement information (e.g., velocity information, acceleration information, etc.), and the like. The image generation component 230 can further generate image elements (e.g., symbols or other representations) in the image representing the various attributes of the object(s) and the environment, including but not limited to: one or more velocity vectors, one or more acceleration vectors, lighting indicators (e.g., braking lights of the object, turn signal lights of the object, etc., represented as respective indicator status), traffic light information (e.g., status of a traffic light), lane information (e.g., whether the lane is a left turn only lane, right turn only lane, etc.), and the like.

Further, the image generation component 230 can generate one or more channels comprising action data, as discussed herein. For example, action data can comprise identifying a current lane and/or a target lane associated with a candidate action.

In some examples, the image generation component 230 can generate one or more images comprising semantic information of the environment, as discussed in detail herein.

In some examples, the image generation component 230 can generate one or more images representing a trace of an object in the environment. The image(s) generated by the image generation component 230 can represent prior information about the state of the environment and objects in the environment that can be used to generate at prediction probabilit(ies), as discussed herein.

In any of the examples discussed herein, the image generation component 230 may generate an image having multiple channels, wherein each channel is representative of some information (semantic or otherwise).

In some examples, the machine learned component 232 (also referred to as a machine learned model component 232) can include functionality to receive the image(s) generated by the image generation component 230 and to generate one or more heat maps including prediction probabilities, as discussed herein.

In some instances, the machine learned component 232 can include one or more machine learning models trained to output one or more heat maps based on top-down images input into the model. In some examples, the machine learned component 232 can include a convolutional neural network (CNN), which may or may not include one or more recurrent neural network (RNN) layers, for example, long short-term memory (LSTM) layers.

In some examples, a heat map output by the machine learned component 232 can represent a discretized region of the environment proximate to the autonomous vehicle. For example, the heat map can represent a 64×64 grid (or J×K sized grid) representing a 100 meter by 100 meter region around the autonomous vehicle. In some examples, an area represented by a heat map can correspond to the area represented by the images input to the machine learned component 232. Of course, the heat map can represent any size of region and can represent any number of discrete portions of the region. In some cases, a portion of the heat map can be referred to as a cell of the heat map. Each cell can comprise a prediction probability representing a probability that the object will be at the corresponding location in the environment at the time corresponding to the heat map. In some instances, the machine learning model can output a plurality of heat maps, wherein a heat map of the plurality of heat maps can represent probability predictions associated with the object at a particular time in the future (e.g., 0.5 second, 1 second, 3 seconds, 5 seconds, 10 seconds, etc.).

In some examples, the machine learned component 232 can be trained to generate any number of heat maps based on any number of input images. For example, the machine learned component 232 can receive N number of input images and can output M number of heat maps.

In general, the planning component 234 can determine a path for the vehicle 202 to follow to traverse through an environment.

In some examples, the trajectory generation component 236 can include functionality to determine various routes and trajectories and various levels of detail. For example, the trajectory generation component 236 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the trajectory generation component 236 can generate an instruction for guiding the autonomous vehicle along at least a portion of the route from the first location to the second location. In at least one example, the trajectory generation component 236 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 202 to navigate.

In some examples, the evaluation component 238 can include functionality to evaluate one or more candidate actions and/or candidate trajectories. For example, for each set of heat maps comprising prediction probabilities associated with each action, the evaluation component 238 can determine one or more costs, amount of risk, and/or rewards. In some examples, the evaluation component 238 can determine an amount of overlap between a candidate location of the vehicle 202 and prediction probabilities associated with an object in an environment. In some examples, the evaluation component 238 can determine distance(s) between a representation of the vehicle 202 (e.g., a bounding box or a dilated bounding box) and prediction probabilities and/or dilated prediction probabilities associated with an object. In at least some examples, such dilations (whether to the bounding boxes as input or to the prediction probabilities output) may be based on a safety factor in order to artificially increase the regions around probably locations of the object in the future. In some examples, the evaluation component 238 can determine whether a trajectory for the vehicle 202 traverses through regions associated with prediction probabilities (which may include dilated prediction probabilities) associated with the vehicle 202. The evaluation component 238 can determine costs, risks, and/or rewards at individual time steps in the future and/or cumulatively for some or all time steps associated with a candidate action. Accordingly, the evaluation component 238 can compare costs, risks, and/or rewards for different candidate actions and can select an action for controlling the vehicle.

Examples of evaluating a candidate action are discussed in connection with U.S. patent application Ser. No. 16/206,877, entitled "Probabilistic Risk Assessment for Trajectory Evaluation," and filed Nov. 30, 2018. application Ser. No. 16/206,877 is herein incorporated by reference, in its entirety.

Additional costs to be considered by the evaluation component 238 can include, but are not limited to, a positional based cost (e.g., based on distances between prediction probabilities associated with the vehicle 202 and object(s)), a velocity cost (e.g., based on enforcing a velocity while traversing through a region associated with prediction probabilities), an acceleration cost (e.g., enforcing acceleration bounds throughout trajectory candidate action), an expectation that the object may follow rules of the road, and the like.

In some instances, the machine learned component 232 can provide the heat map(s) directly to the planning component 234, which in turn can select or determine an action for the vehicle 202 to perform and/or can generate a trajectory for the vehicle 202 to follow.

In some instances, aspects of some or all of the components discussed herein can include any models, algorithms, and/or machine learning algorithms. For example, in some instances, the components in the memory 218 (and the memory 246, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 206 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 206 can include multiple instances of each of these or other types of sensors. For instance, the lidar sensors can include individual lidar sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the vehicle computing device 204. Additionally or alternatively, the sensor system(s) 206 can send sensor data, via the one or more networks 240, to the one or more computing device(s) at a particular frequency, after a lapse of a predetermined period of time, in near real-time, etc.

The vehicle 202 can also include one or more emitters 208 for emitting light and/or sound, as described above. The emitters 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive system(s) 214. Also, the communication connection(s) 210 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device 204 to another computing device or a network, such as network(s) 240. For example, the communications connection(s) 210 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive systems 214. In some examples, the vehicle 202 can have a single drive system 214. In at least one example, if the vehicle 202 has multiple drive systems 214, individual drive systems 214 can be positioned on opposite ends of the vehicle 202 (e.g., the front and the rear, etc.). In at least one example, the drive system(s) 214 can include one or more sensor systems to detect conditions of the drive system(s) 214 and/or the surroundings of the vehicle 202. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 214. In some cases, the sensor system(s) on the drive system(s) 214 can overlap or supplement corresponding systems of the vehicle 202 (e.g., sensor system(s) 206).

The drive system(s) 214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 214. Furthermore, the drive system(s) 214 also include one or more communication connection(s) that enable communication by the respective drive system with one or more other local or remote computing device(s).

In at least one example, the direct connection 212 can provide a physical interface to couple the one or more drive system(s) 214 with the body of the vehicle 202. For example, the direct connection 212 can allow the transfer of energy, fluids, air, data, etc. between the drive system(s) 214 and the vehicle. In some instances, the direct connection 212 can further releasably secure the drive system(s) 214 to the body of the vehicle 202.

In some examples, the vehicle 202 can send sensor data to one or more computing device(s) 242 via the network(s) 240. In some examples, the vehicle 202 can send raw sensor data to the computing device(s) 242. In other examples, the vehicle 202 can send processed sensor data and/or representations of sensor data to the computing device(s) 242. In some examples, the vehicle 202 can send sensor data to the computing device(s) 242 at a particular frequency, after a lapse of a predetermined period of time, in near real-time, etc. In some cases, the vehicle 202 can send sensor data (raw or processed) to the computing device(s) 242 as one or more log files.

The computing device(s) 242 can include processor(s) 244 and a memory 246 storing a training component 248.

In some instances, the training component 248 can include functionality to train a machine learning model to output one or more heat maps including prediction probabilities. For example, the training component 248 can receive a set of images representing a top-down view of an environment. In some cases, the set of images can represent an object traversing through an environment for a period of time, such as 5 seconds, 7 seconds, 10 seconds, 20 seconds, and the like. At least a portion of the set of images can be used as an input to train the machine learning model, and at least a portion of the set of images can be used as ground truth information for training the machine learning model. As a non-limiting example, a first set (e.g., 3, 4, 5, or more) of a sequence of images may be input into the machine learned model. In some instances, an intent, goal, sub-goal, etc. of the vehicle 202 can be input for training as well (e.g., as may be encoded as a channel of the multi-channel image). A second set of images (or trajectory information associated therefrom—e.g., by extracting positions and/or velocities from the images) in the sequence of images immediately preceding the first set may then be used as ground truth for training the model. Thus, by providing images of recorded trajectories where objects traverse an environment, the prediction components 228 can be trained to output one or more heat maps including prediction probabilities, as discussed herein.

In some examples, the training component 248 can include training data that has been generated by a simulator. For example, simulated training data can represent examples where a vehicle collides with an object in an environment or nearly collides with an object in an environment, to provide additional training examples.

Additional details of the training component 248 are discussed below in connection with FIG. 2B, as well as throughout this disclosure.

Additional examples of data for training are discussed in connection with FIG. 3, as well as throughout this disclosure.

The processor(s) 216 of the vehicle 202 and the processor(s) 244 of the computing device(s) 242 can be any suitable processor capable of executing instructions to process data and perform operations as described herein. By way of example and not limitation, the processor(s) 216 and 244 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and 246 are examples of non-transitory computer-readable media. The memory 218 and 246 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 218 and 246 can include at least a working memory and a storage memory. For example, the working memory may be a high-speed memory of limited capacity (e.g., cache memory) that is used for storing data to be operated on by the processor(s) 216 and 244. In some instances, the memory 218 and 246 can include a storage memory that may be a lower-speed memory of relatively large capacity that is used for long-term storage of data. In some cases, the processor(s) 216 and 244 cannot operate directly on data that is stored in the storage memory, and data may need to be loaded into a working memory for performing operations based on the data, as discussed herein.

It should be noted that while FIG. 2 is illustrated as a distributed system, in alternative examples, components of the vehicle 202 can be associated with the computing device(s) 242 and/or components of the computing device(s) 242 can be associated with the vehicle 202. That is, the vehicle 202 can perform one or more of the functions associated with the computing device(s) 242, and vice versa.

Figure 2B:
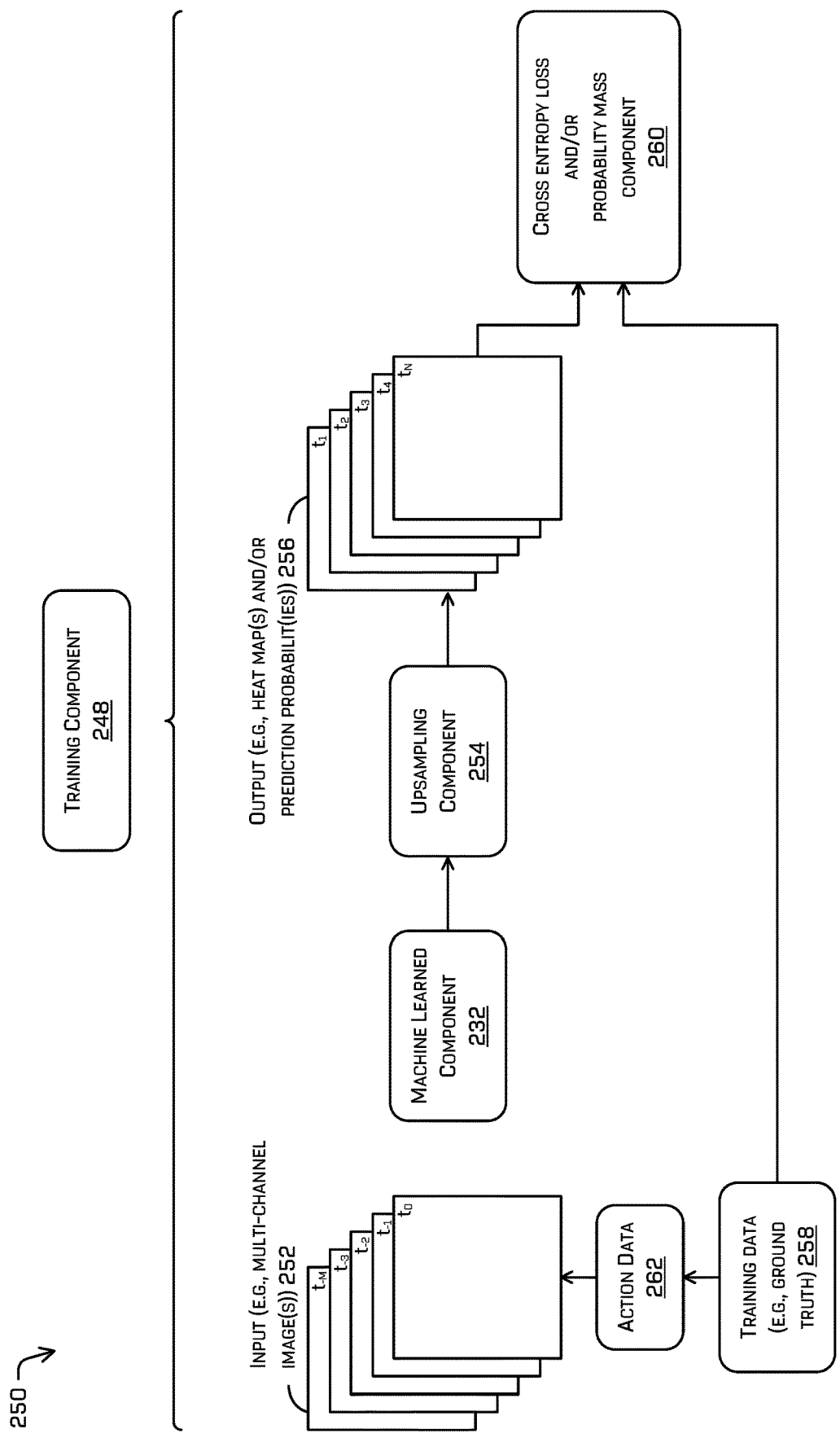
FIG. 2B depicts a block diagram of an example training component for training a machine learned model to implement the techniques described herein.

FIG. 2B depicts a block diagram 250 of an example training component for training a machine learned model to implement the techniques described herein.

In some examples, training data 258 can comprise data captured by a vehicle as it traverses through an environment. Such training data can include action data 262, which may represent actions performed by an autonomous vehicle, if such an autonomous vehicle captured the training data 258. In some examples, an input 252 can be based at least in part on the action data 262 and the training data 258.

The input 252 comprising one or more multi-channel images can be input to the machine learned component 232. In some examples, the machine learned component 232 can comprise a ResNet architecture. In some examples, the machine learned component 232 can comprise the ResNet architecture as a base backbone. In some examples, action data can be input along the input 252, wherein the action data can be represented as action data 262.

In some examples, an output feature map can be passed through a 1×1 convolution to obtain the final channel dimension, which can be bilinearly upsampled (e.g., via an upsampling component 254) to match an input resolution, which is represented as an output 256 (e.g., heat maps and/or prediction probabilit(ies)).

In some examples, the output logits from the machine learned component 232 can be compared against training data 258 (e.g., ground truth representing an occupancy map) using a sigmoid cross entropy loss.

A cross entropy loss and/or probability mass component 260 can include functionality to compare the output logits against the training data 258. A resulting loss matrix can then be balanced across occupied and unoccupied pixels in the training data 258 according to the following function:

$$L_{balance} = 0.5 \times \sum_{i=0}^{N} \left( \frac{1_{occupied_i} L_i}{n_{occupied_i}} + \frac{1_{unoccupied_i} L_i}{n_{unoccupied_i}} \right) \quad (1)$$

where $L_i$ is a loss matrix obtained from sigmoid cross entropy loss at an i-th step in the future, N are the number of future steps being predicted. The terms $1_{occupied}$ and $1_{unoccupied}$ are indicator matrices representing the occupancy and unoccupancy map of objects in future, and the terms $n_{occupied}$ and $n_{unoccupied}$ represents the number of occupied and unoccupied cells in the future. Balancing across occupancy ensures that an equal number (or roughly equal) of occupied and unoccupied gradients pass through back propagation and that the prediction component 228 does not bias towards predicting all cells as occupied or all cells as unoccupied.

The dense segmentation cost specified in equation (1) above may not conserve the total number of entities in a scene. In some examples, the cross entropy loss and/or probability mass component 260 can include an additional cost to minimize differences between a total probability mass (e.g., a sum of probabilities associated with a heat map) predicted by the prediction component 228 in a scene and the actual number of occupied cells as:

$$L_{prob} = 0.5 \times \Sigma_{i=0}^{N}(n_{occupied_i} - \Sigma_j \phi_i[j]) \quad (2)$$

where $\phi_i$ represents the occupancy map at step i in future. By adding the probability mass component, the prediction component 228 can distribute the total probability mass among available cells without creating additional probability mass. For example, if the autonomous vehicle has two possible modes, then the network may distribute the probability of occupancy among the two modes and not add any additional occupancy probability.

Further, constraining or otherwise managing the mass of a scene limits an availability of the network to add additional objects into an environment, which may simplify processing.

Figure 3:
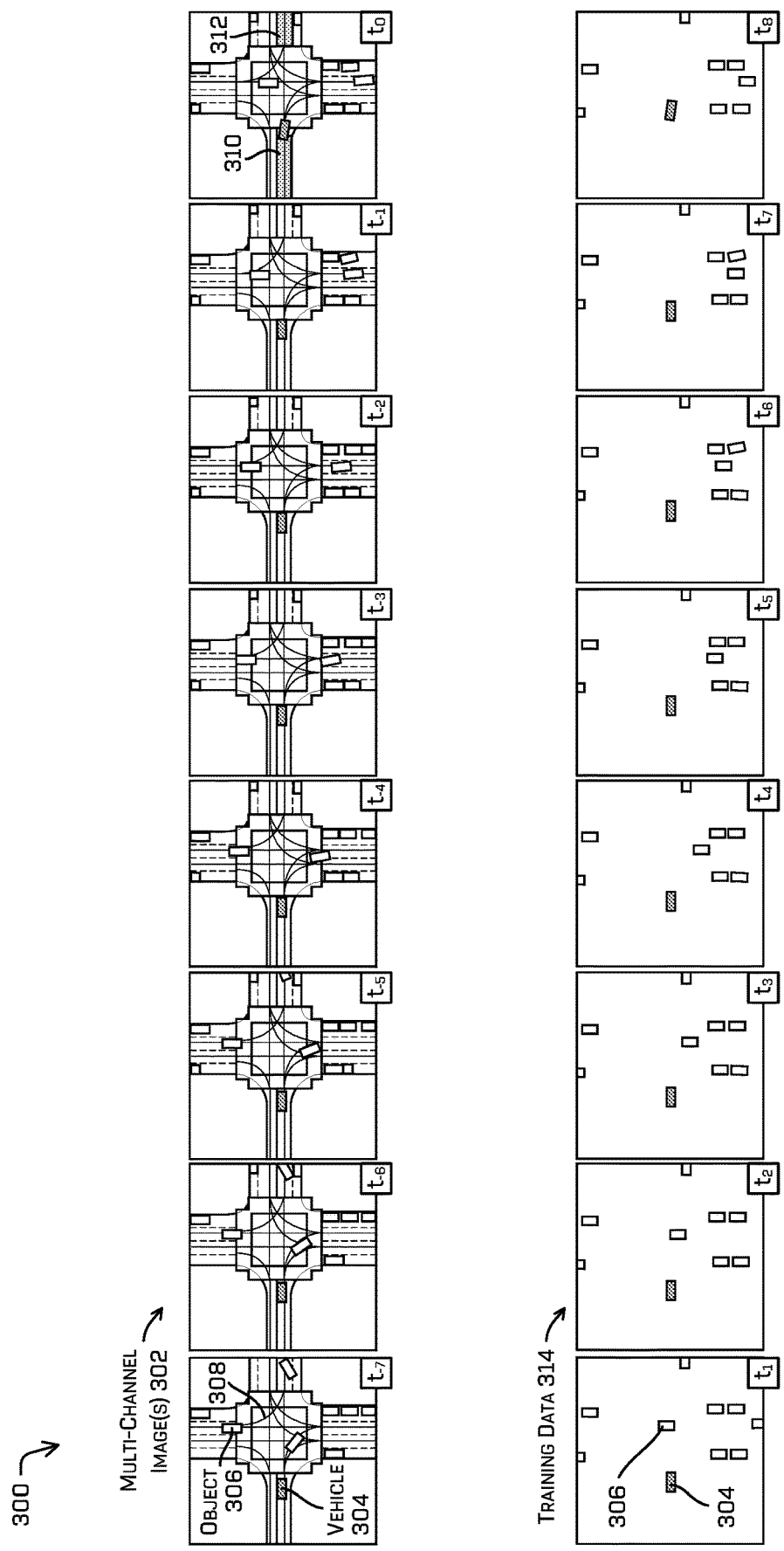
FIG. 3 depicts example illustrations of inputs to a prediction system and training data for training the prediction system, in accordance with examples of the disclosure.

FIG. 3 depicts example illustrations 300 of inputs to a prediction system and training data for training the prediction system, in accordance with examples of the disclosure.

For example, multi-channel images 302 represent inputs to the prediction component 228 and represent the objects in the past. For example, a time associated with each image is illustrated in the lower-right corner (e.g., $t_{-8}$, $t_{-7}$, $t_{-6}$, $t_{-5}$, $t_{-4}$, $t_{-3}$, $t_{-2}$, $t_{-1}$, and $t_0$). As discussed above, each frame may be further composed of several channels.

For example, an individual channel may represent, but are not limited to, one or more of: a bounding box (e.g., a bounding box representing a vehicle 304 or an object 306, with a color or channel of the bounding box representing a classification of the object associated with the bounding box), a velocity of the bounding box in an x-direction and a y-direction (where a velocity can be represented as a number encoded in an area representing an area of another channel corresponding to the bounding box (e.g., channels 136 and 142), with the x-velocity and the y-velocity represented in different channels), an acceleration of the object in an x-direction and a y-direction (where an acceleration can be represented as a vector in one channel or in multiple channels, with the x-acceleration and the y-acceleration represented in different channels), a blinker status associated with the bounding box (e.g., left-turn, right-turn, braking, reverse, hazards, no lights, etc.), road network information (e.g., semantic labels indicating lanes, reference lines (e.g., reference lines 308), crosswalks, stop signs, intersections, traffic lights, and the like), traffic light status (e.g., red light, yellow light, green light, etc.), and the like. In some examples, the plurality of channels can be input to the prediction system to generate at least one heat map.

Further, action data can be represented as a current lane 310 and a target lane 312. In some examples, action data can be encoded in one or more of the images representing the environment at times $t_7$ through $t_0$.

The top-down features are represented as an image blob by stacking some or all of the feature images described above. In some examples, the resolution of the multi-channel image(s) 302 can be set based on a resolution of a sensor resolution to 15 cm per pixel. In some examples, a single frame of the multi-channel images 302 can correspond to an area the size of 50 meters×50 meters, although any area can be selected. In some examples, the multi-channel images(s) 302 can be rotated and translated so that the vehicle 304 (e.g., an autonomous vehicle) is facing from left to right and is approximately centered in the multi-channel image 302 with a configurable horizontal offset. In some examples, the environment represented by the multi-channel images may represent non-traffic light junctions for prediction, in which case a traffic light state of each lane may not be included in the top-down representation.

Training data 314 represents a ground truth of all objects and vehicles in the environment. The training data 314 can include any number of frames in the future. FIG. 3 illustrates training data at times $t_1$, $t_2$, $t_3$, $t_4$, $t_5$, $t_6$, $t_7$, and $t_8$. The training data 314 can correspond to the training data 258 of FIG. 2, for the purposes of training the machine learned component 232, for example.

Figure 4:
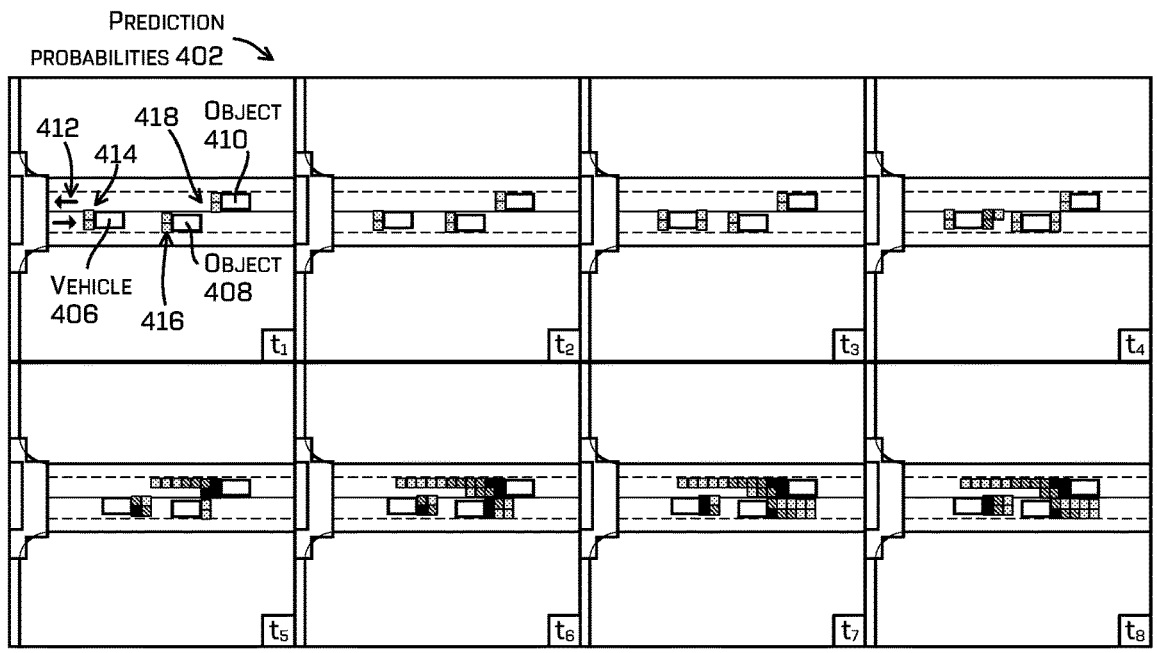
FIG. 4 is an illustration of first and second prediction probabilities of a scenario including two double parked vehicles, where the second prediction probabilities are based in part on action data, in accordance with examples of the disclosure.
Figure 4:
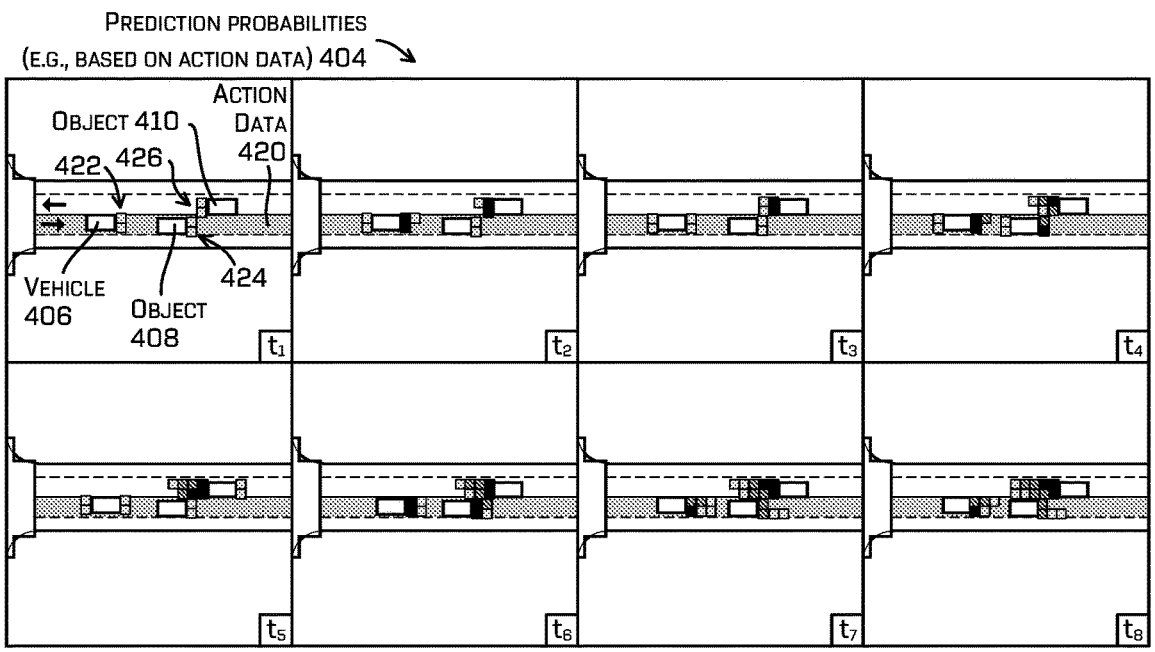

FIG. 4 is an illustration 400 of first and second prediction probabilities of a scenario including two double parked vehicles, where the second prediction probabilities are based in part on action data, in accordance with examples of the disclosure.

Prediction probabilities 402 refer to a series of eight frames (labeled $t_1$-$t_8$) illustrating an output of the prediction component 228, whereby the prediction probabilities 402 are not based in part on action data. In a first frame of the prediction probabilities 402 (illustrated as frame $t_1$), the scenario represents a vehicle 406 and objects 408 and 410. Arrows 412 indicate a direction of traffic associated with the environment. A similar indication of a direction of traffic is used throughout this disclosure.

The objects 408 and 410 in the scenario represent two double parked vehicle. Prediction probabilities 414 are output by the prediction component 228 representing prediction probabilities associated with the vehicle 406 at time $t_1$. Prediction probabilities 416 and 418 are associated with the objects 408 and 410, respectively. The prediction probabilities 402 are illustrated as evolving over time as determined by the prediction component 228.

Prediction probabilities 404 refer to a series of eight frames (labeled $t_1$-$t_8$) illustrating an output of the prediction component 228, whereby the prediction probabilities are based in part on action data 420 (illustrated as a grey shaded lane). Prediction probabilities 422 are associated with the vehicle 406, while prediction probabilities 424 and 426 are associated with objects 408 and 410, respectively. The prediction probabilities 404 are illustrated as evolving over time as determined by the prediction component 228.

Figure 5:
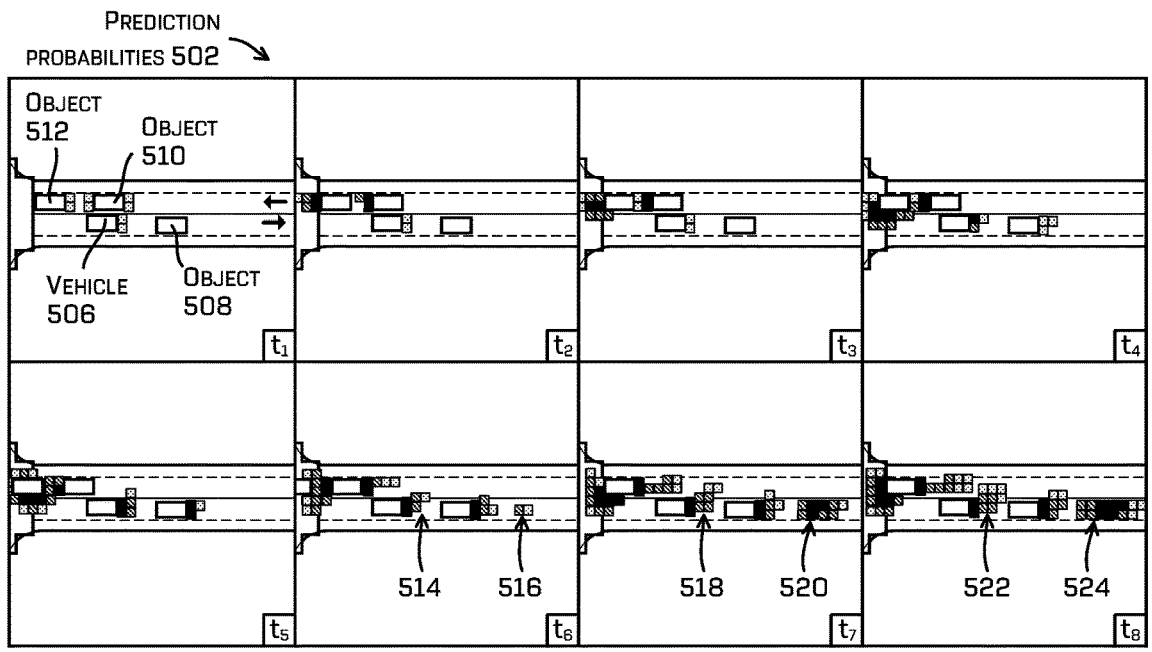
FIG. 5 is an illustration of first and second prediction probabilities of a scenario including a double parked vehicle, where the second prediction probabilities are based in part on action data, in accordance with examples of the disclosure.
Figure 5:
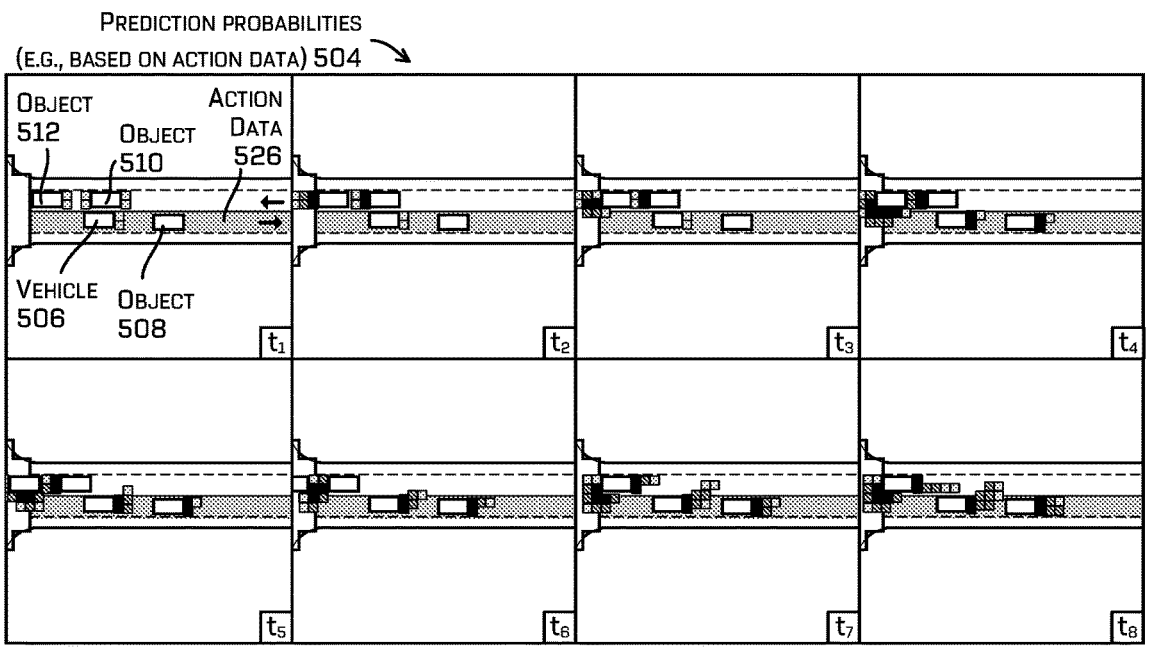

FIG. 5 is an illustration 500 of first and second prediction probabilities of a scenario including a double parked vehicle, where the second prediction probabilities are based in part on action data, in accordance with examples of the disclosure.

Prediction probabilities 502 refer to a series of eight frames (labeled $t_1$-$t_8$) illustrating an output of the prediction component 228, whereby the prediction probabilities 502 are not based in part on action data. In a first frame of the prediction probabilities 502 (illustrated as frame $t_1$), the scenario represents a vehicle 506 and objects 508, 510, and 512.

The object 508 represents a double parked vehicle. The objects 510 and 512 represent oncoming traffic with respect to the vehicle 506.

Of note, the prediction probabilities 502 represent non-contiguous prediction probabilities associated with the vehicle 506. For example, at time $t_6$, prediction probabilities 514 and 516 are associated with the vehicle 506. At time $t_7$, prediction probabilities 518 and 520 are associated with the vehicle 506. And at time $t_8$, prediction probabilities 522 and 524 are associated with the vehicle 506. The prediction probabilities 502 are illustrated as evolving over time as determined by the prediction component 228.

Prediction probabilities 504 refer to a series of eight frames (labeled $t_1$-$t_8$) illustrating an output of the prediction component 228, whereby the prediction probabilities are based in part on action data 526 (illustrated as a grey shaded lane).

Of note, the prediction probabilities 504 associated with the vehicle 506 do not exhibit non-contiguous areas and instead represent the vehicle 506 traversing around the object 508. The prediction probabilities 504 are illustrated as evolving over time as determined by the prediction component 228.

Figure 6:
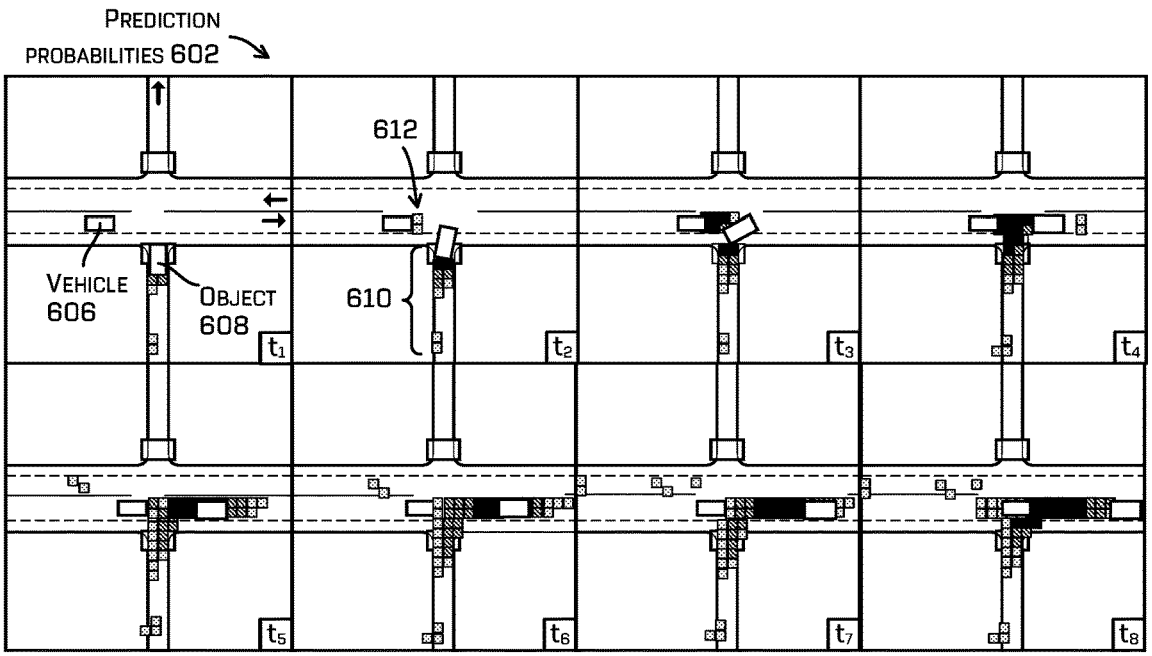
FIG. 6 is an illustration of first and second prediction probabilities of a scenario including an object turning in front of an autonomous vehicle, where the second prediction probabilities are based in part on action data, in accordance with examples of the disclosure.
Figure 6:
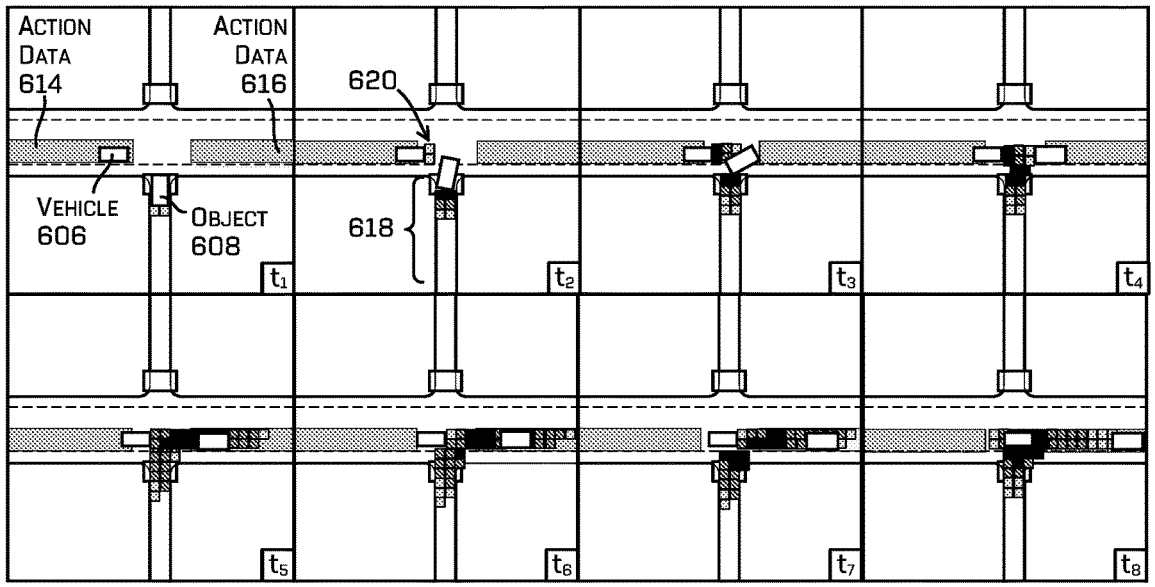

FIG. 6 is an illustration 600 of first and second prediction probabilities of a scenario including an object turning in front of an autonomous vehicle, where the second prediction probabilities are based in part on action data, in accordance with examples of the disclosure.

Prediction probabilities 602 refer to a series of eight frames (labeled $t_1$-$t_8$) illustrating an output of the prediction component 228, whereby the prediction probabilities 602 are not based in part on action data. In a first frame of the prediction probabilities 602 (illustrated as frame $t_1$), the scenario represents a vehicle 606 and an object 608.

The object 608 represents a vehicle turning into a lane in front of the vehicle 606.

Of note, prediction probabilities associated with the region 610 in frame $t_2$ (and corresponding regions in frames $t_3$-$t_8$) are associated with the object 608, while prediction probabilities 612 are associated with the vehicle 606. The prediction probabilities 602 are illustrated as evolving over time as determined by the prediction component 228.

Prediction probabilities 604 refer to a series of eight frames (labeled $t_1$-$t_8$) illustrating an output of the prediction component 228, whereby the prediction probabilities are based in part on action data 614 and 616 (illustrated as a grey shaded lane). The action data 614 can correspond to a current (or exiting) lane, while the action data 616 can correspond to a target (or entering) lane.

Prediction probabilities associated with the region 618 in frame $t_2$ (and corresponding regions in frames $t_3$-$t_8$) are associated with the object 608, while prediction probabilities 620 are associated with the vehicle 606. The prediction probabilities 604 are illustrated as evolving over time as determined by the prediction component 228.

Figure 7:
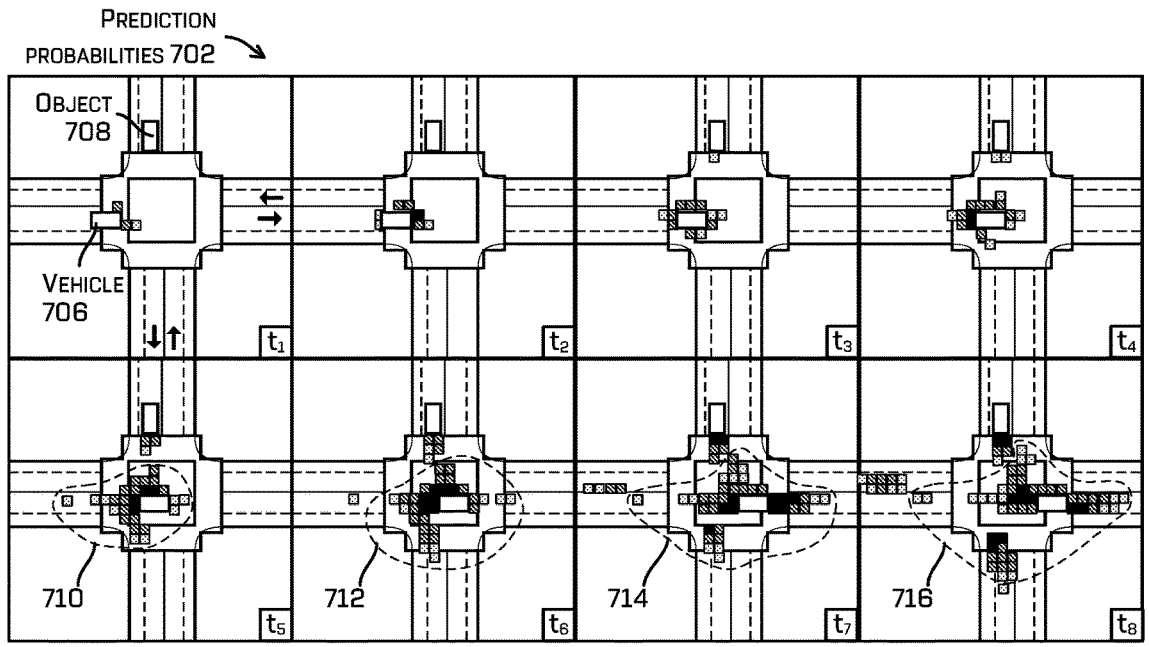
FIG. 7 is an illustration of first and second prediction probabilities of a scenario including an autonomous vehicle traversing a junction, where the second prediction probabilities are based in part on action data, in accordance with examples of the disclosure.
Figure 7:
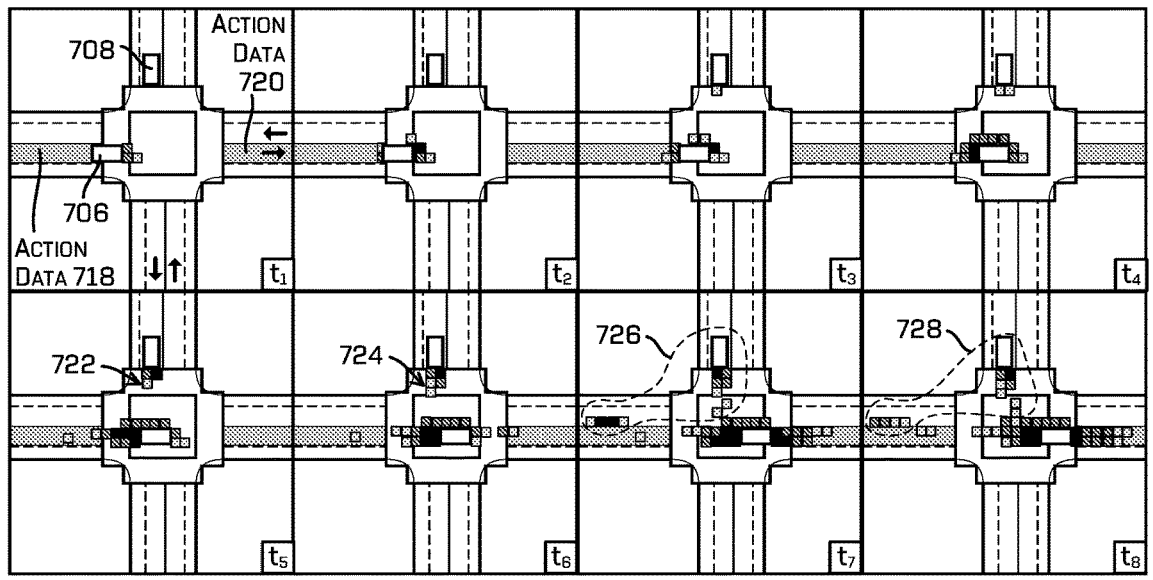

FIG. 7 is an illustration 700 of first and second prediction probabilities of a scenario including an autonomous vehicle traversing a junction, where the second prediction probabilities are based in part on action data, in accordance with examples of the disclosure.

Prediction probabilities 702 refer to a series of eight frames (labeled $t_1$-$t_8$) illustrating an output of the prediction component 228, whereby the prediction probabilities 702 are not based in part on action data. In a first frame of the prediction probabilities 702 (illustrated as frame $t_1$), the scenario represents a vehicle 706 and an object 708.

The scenario in FIG. 7 represents the vehicle 706 crossing a junction in front of the object 708 represents a vehicle turning into a lane in front of the vehicle 606.

Of note, prediction probabilities 710, 712, 714, and 716 (e.g., those inside the respective dashed lines) represent prediction probabilities associated with the vehicle 706, illustrating the multi-modal output of the prediction probabilities. The prediction probabilities 702 are illustrated as evolving over time as determined by the prediction component 228.

Prediction probabilities 704 refer to a series of eight frames (labeled $t_1$-$t_8$) illustrating an output of the prediction component 228, whereby the prediction probabilities are based in part on action data 718 and 720 (illustrated as a grey shaded lane). The action data 718 can correspond to a current (or exiting) lane, while the action data 720 can correspond to a target (or entering) lane.

Prediction probabilities 722, 724, 726, and 728 are associated with the object 708, while the respective remaining prediction probabilities are associated with the vehicle 706. Thus, the prediction probabilities 704 represent a crisper prediction of locations associated with the vehicle 706, which can lead towards more accurate predictions. The prediction probabilities 704 are illustrated as evolving over time as determined by the prediction component 228.

Figure 8:
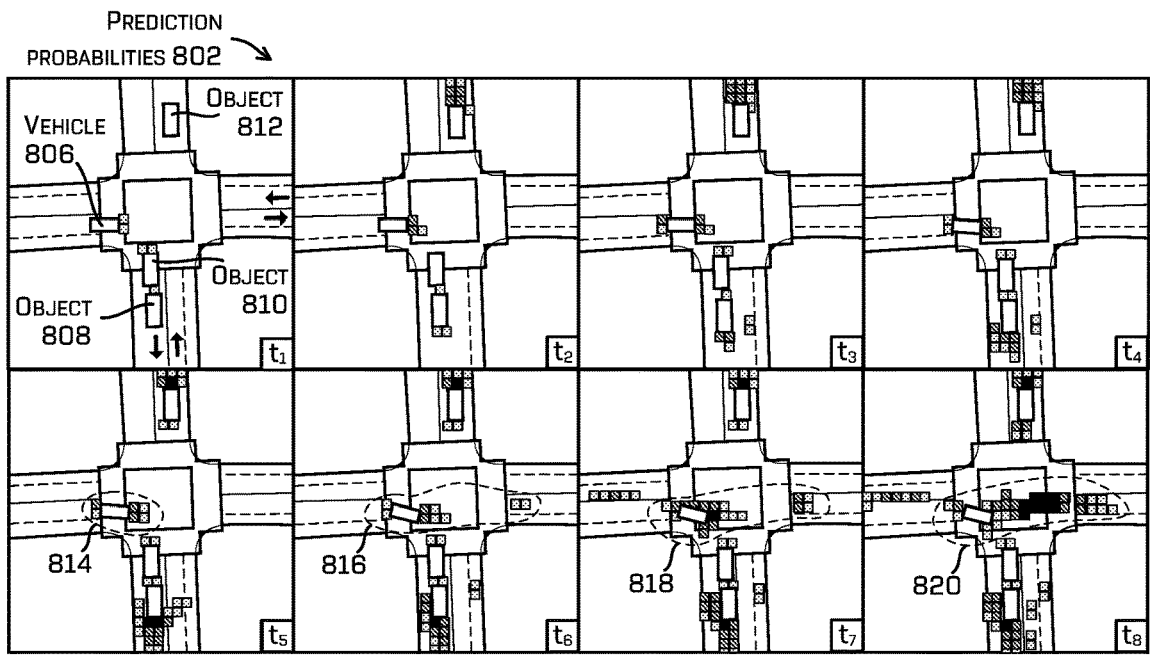
FIG. 8 is an illustration of first and second prediction probabilities of a scenario including an autonomous vehicle entering a blocked junction, where the second prediction probabilities are based in part on action data, in accordance with examples of the disclosure.
Figure 8:
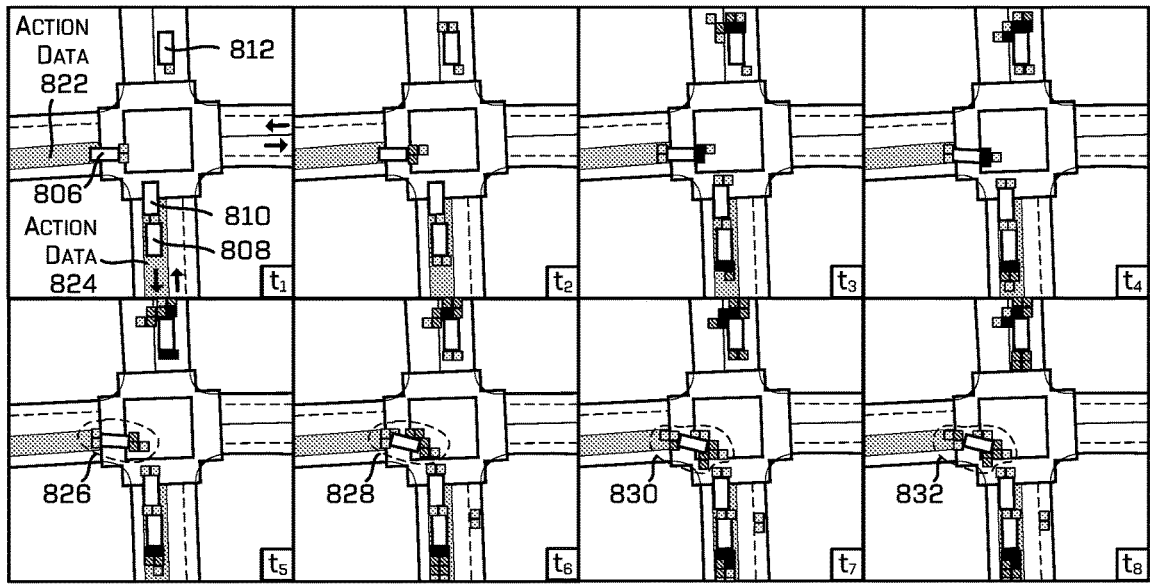

FIG. 8 is an illustration 800 of first and second prediction probabilities of a scenario including an autonomous vehicle entering a blocked junction, where the second prediction probabilities are based in part on action data, in accordance with examples of the disclosure.

Prediction probabilities 802 refer to a series of eight frames (labeled $t_1$-$t_8$) illustrating an output of the prediction component 228, whereby the prediction probabilities 802 are not based in part on action data. In a first frame of the prediction probabilities 802 (illustrated as frame $t_1$), the scenario represents a vehicle 806 and objects 808, 810, and 812.

The scenario in FIG. 8 represents the vehicle 806 at a junction intending to turn right to follow the objects 808 and 120.

Of note, prediction probabilities 814, 816, 818, and 820 (e.g., those inside the respective dashed lines) represent prediction probabilities associated with the vehicle 806, illustrating the multi-modal output of the prediction probabilities. The prediction probabilities 802 are illustrated as evolving over time as determined by the prediction component 228.

Prediction probabilities 804 refer to a series of eight frames (labeled $t_1$-$t_8$) illustrating an output of the prediction component 228, whereby the prediction probabilities are based in part on action data 822 and 824 (illustrated as a grey shaded lane). The action data 822 can correspond to a current (or exiting) lane, while the action data 824 can correspond to a target (or entering) lane.

Prediction probabilities 826, 828, 830, and 832 are associated with the vehicle 806, while the respective remaining prediction probabilities are associated with the objects 808, 810, or 812. Thus, the prediction probabilities 804 represent a crisper prediction of locations associated with the vehicle 806, which can lead towards more accurate predictions. The prediction probabilities 804 are illustrated as evolving over time as determined by the prediction component 228.

Figure 9:
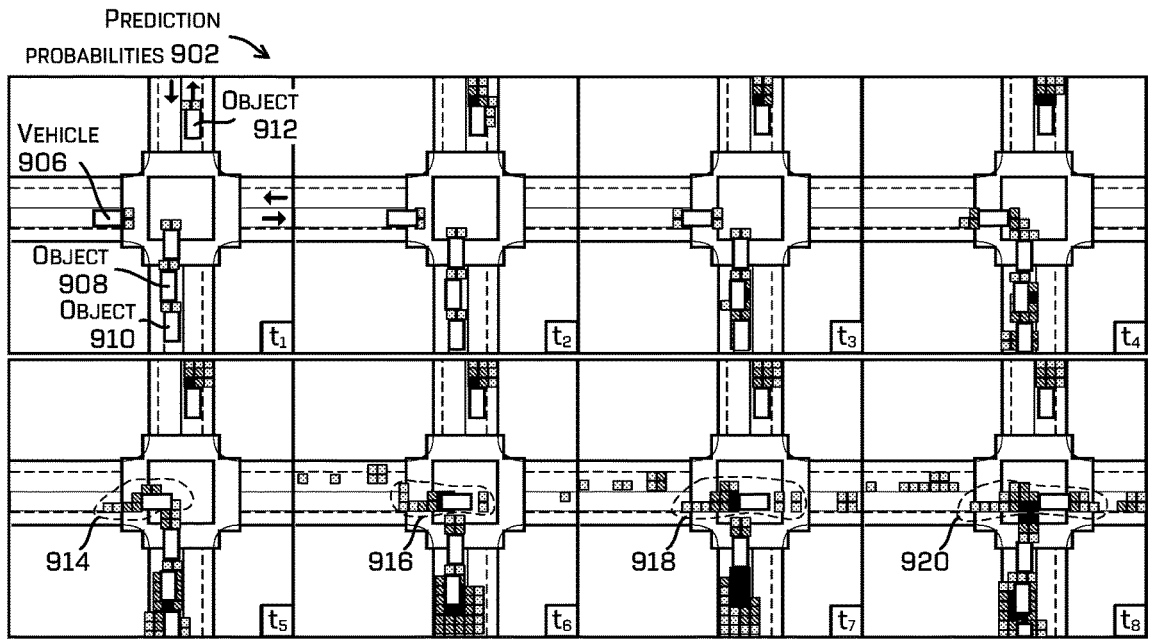
FIG. 9 is an illustration of first and second prediction probabilities of a scenario including an autonomous vehicle traversing another junction, where the second prediction probabilities are based in part on action data, in accordance with examples of the disclosure.
Figure 9:
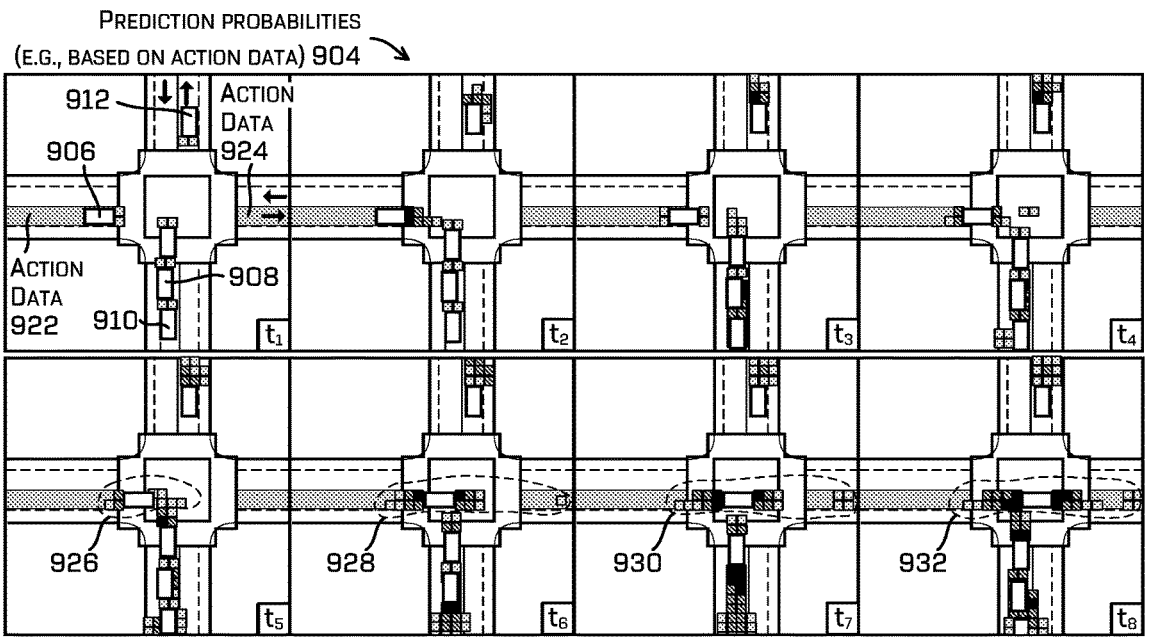

FIG. 9 is an illustration 900 of first and second prediction probabilities of a scenario including an autonomous vehicle traversing another junction, where the second prediction probabilities are based in part on action data, in accordance with examples of the disclosure.

Prediction probabilities 902 refer to a series of eight frames (labeled $t_1$-$t_8$) illustrating an output of the prediction component 228, whereby the prediction probabilities 902 are not based in part on action data. In a first frame of the prediction probabilities 902 (illustrated as frame $t_1$), the scenario represents a vehicle 806 and objects 808, 810, and 812.

The scenario in FIG. 9 represents the vehicle 906 at a junction intending cross the junction. In this example, because the target lane for the vehicle 906 is not blocked, the vehicle 906 makes its way to the goal. In the unconditional case (e.g., represented by the prediction probabilities 902), the network proposes that the vehicle 906 can turn right, left or go straight but is not sure which one the vehicle 906 will take.

Of note, prediction probabilities 914, 916, 918, and 920 (e.g., those inside the respective dashed lines) represent prediction probabilities associated with the vehicle 906, illustrating the dispersed modal output of the prediction probabilities. The prediction probabilities 902 are illustrated as evolving over time as determined by the prediction component 228.

Prediction probabilities 904 refer to a series of eight frames (labeled $t_1$-$t_8$) illustrating an output of the prediction component 228, whereby the prediction probabilities are based in part on action data 922 and 924 (illustrated as a grey shaded lane). The action data 922 can correspond to a current (or exiting) lane, while the action data 924 can correspond to a target (or entering) lane.

Figure 10:
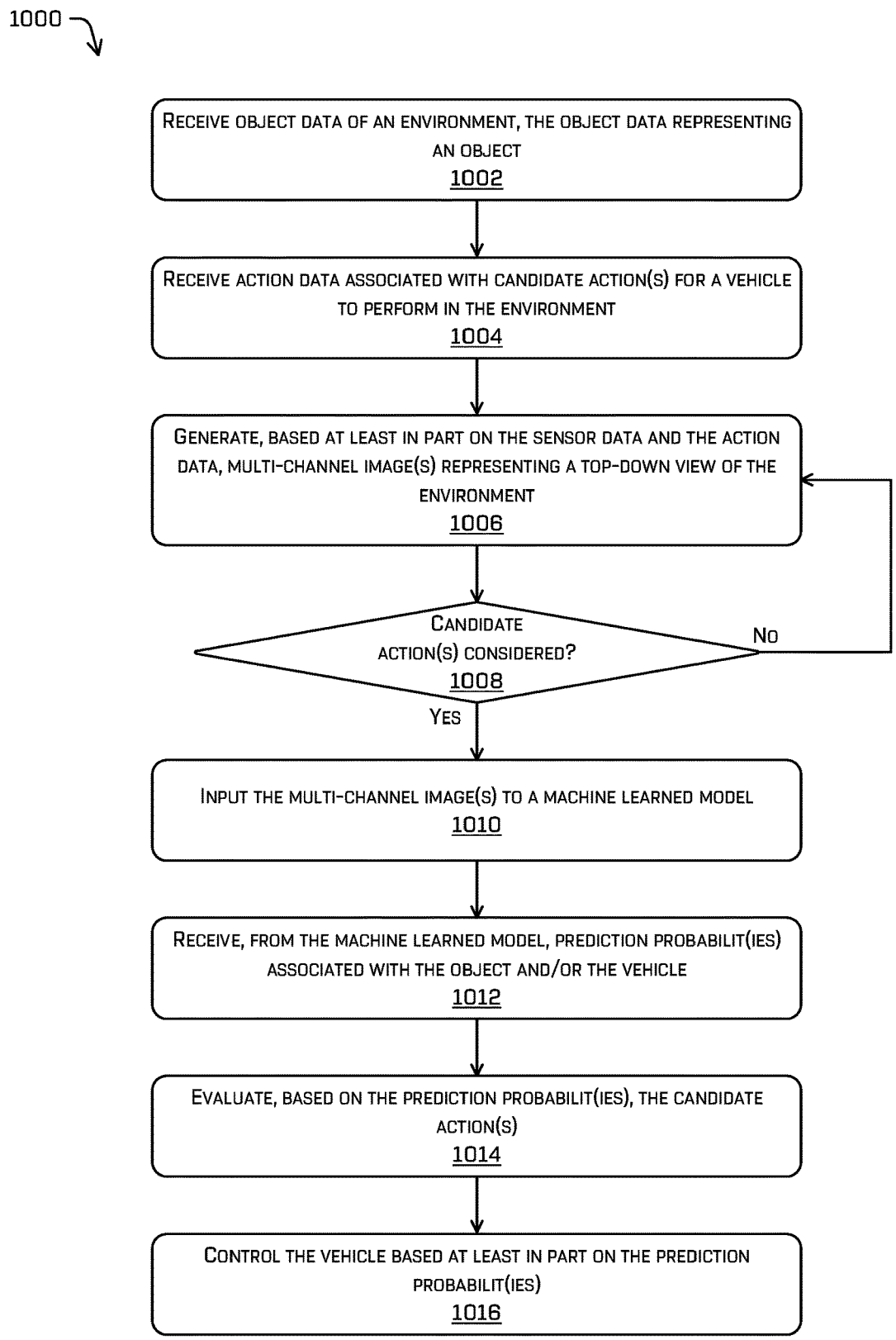
FIG. 10 depicts an example process for receiving sensor data and action data, generating a multi-channel image, evaluating prediction probabilities, and controlling a vehicle based on the prediction probabilities, in accordance with examples of the disclosure.

Prediction probabilities 926, 928, 930, and 932 are associated with the vehicle 906, while the respective remaining prediction probabilities are associated with the objects 908, 910, or 912. Thus, the prediction probabilities 904 represent a crisper prediction of locations associated with the vehicle 906, which can lead towards more accurate predictions. The prediction probabilities 904 are illustrated as evolving over time as FIGS. 1, 2B, and 10 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 10 depicts an example process 1000 for receiving sensor data and action data, generating a multi-channel image, evaluating prediction probabilities, and controlling a vehicle based on the prediction probabilities, in accordance with examples of the disclosure. For example, some or all of the process 1000 can be performed by one or more components in FIG. 2, as described herein. For example, some or all of the process 1000 can be performed by the vehicle computing device(s) 204 and/or the computing device(s) 242.

At operation 1002, the process can include receiving object data of an environment, the object data representing an object. In some examples, object data can represent data as output by a perception system of an autonomous vehicle. For example, object data can include but is not limited to bounding box information, velocity/acceleration information, classification, and the like. In some examples, the operation 1002 can include capturing sensor data of an environment using a sensor of an autonomous vehicle. For example, the sensor data can include data captured by one or more of a lidar sensor, a radar sensor, an image sensor, a time of flight sensor, a sonar sensor, and the like. In some examples, the operation 1002 can include capturing sensor data using a plurality of sensors and fusing or combining the sensor data into a detail and informative representation of the environment. In at least some examples, additional data may be received (such as map data) which may encode additional data about the environment (location of crosswalks, lane boundaries, etc.).

At operation 1004, the process can include receiving action data associated with candidate action(s) for a vehicle to perform in an environment. In some examples, action data can comprise a current lane, a target lane, and/or velocity or acceleration information, such as a velocity profile or an acceleration profile associated with each action. Examples of candidate actions may include, but are not limited to, a stay-in-lane action, a left turn action, a right turn action, a lane change action, a stop action, a yield action, a merge action, and the like.

At operation 1006, the process can include generating, based at least in part on the sensor data and the action data, multi-channel image(s) representing a top-down view of the environment. Examples of such multi-channel images are discussed throughout this disclosure. For example, the multi-channel image can represent an object as a bounding box, a velocity of the object, a position of the object in the environment, and the like. In some examples, the multi-channel image can comprise acceleration information (instead of or in addition to the velocity information).

In some examples, action data can be represented as a current lane and a target lane, velocity information or acceleration information encoded into a channel of the multi-channel image.

Additional information that can be included in the multi-channel image can include, but is not limited to: a classification of the object associated with the bounding box, a velocity of the bounding box in an x-direction, a y-direction, and/or a z-direction (where a velocity can be represented as a number or vector in one channel or in multiple channels, with the x-velocity, the y-velocity, and/or the z-direction represented in different channels), an acceleration of the object in an x-direction, a y-direction, and/or a z-direction (where an acceleration can be represented as a number or vector in one channel or in multiple channels, with the x-acceleration, the y-acceleration, and/or the z-acceleration represented in different channels), a pose of a vehicle (e.g., x, y, z, roll, pitch, yaw), a rate of change of a pose, a blinker status associated with the bounding box (e.g., left-turn, right-turn, braking, reverse, hazards, no lights, etc.), road network information (e.g., semantic labels indicating lanes, crosswalks, stop signs, intersections, traffic lights, and the like), traffic light status (e.g., red light, yellow light, green light, etc.), and the like. In such a multi-channel image, semantic information about the object and the environment may be encoded in one or more channels as discussed in detail herein.

As discussed herein, the operation 1006 can include generating a plurality of images representing behavior of the object in the environment over time.

At operation 1008, the process can include determining candidate actions have been considered. For example, the operation 1008 can include determining if multi-channel images were generated for each candidate action of a plurality of candidate actions. If not all (or not substantially all) candidate actions have been considered (e.g., "no" in the operation 1008), the process can return to the operation 1006 to generate additional multi-channel images. If all candidate actions have been considered (e.g., "yes" in the operation 1008), the process continues to operation 1010. Of course, in some examples, operations can be performed in parallel, depending on an implementation.

At operation 1010, the process can include inputting the multi-channel image(s) to a machine learned model. Such a machine learned model can be trained to generate (e.g., as a heat map) a plurality of prediction probabilities. Additional details of the machine learned model, the heat map, and the prediction probabilities are discussed throughout the disclosure.

At operation 1012, the process can include receiving, from the machine learned model, prediction probabilit(ies) associated with the object and/or the vehicle. Additional details of the machine learned model, the heat map, and the prediction probabilities are discussed throughout the disclosure.

At operation 1014, the process can include evaluating, based at least in part on the prediction probabilit(ies), the candidate actions. As discussed herein, the operation 1014 can include determining one or more costs, risks, and/or rewards associated with the candidate action. For example, a candidate action can be evaluated to determine, for a trajectory associated with a candidate action, an amount of overlap between a region associated with an autonomous vehicle along the candidate trajectory and one or more prediction probabilities. In some examples, an amount of overlap between a region associated with the autonomous vehicle and prediction probabilities of an object can represent an amount of risk associated with such a candidate action. In some examples, an amount of overlap between a region associated with the autonomous vehicle and prediction probabilities of the autonomous vehicle can represent a degree to which the autonomous vehicle stays within the prediction probabilities. In some examples, a candidate action can be evaluated based on one or more distances between expected locations associated with the autonomous vehicle and prediction probabilities associated with objects.

The operation 1014 can further include selecting or otherwise determining the candidate action based at least in part on the evaluating. For example, costs associated with candidate actions can be compared and candidate action associated with a lowest cost can be selected to control an autonomous vehicle.

At operation 1016, the process can include controlling the vehicle based at least in part on the prediction probabilities. In some examples, the operation 1016 can include determining a trajectory for the autonomous vehicle. In some examples, the trajectory can be based on the candidate action selected to be performed by the vehicle, and can represent a safer and/or smoother trajectory compared to a trajectory generated without evaluating prediction probability(ies), as discussed herein. In some examples, the operation 1016 can include controlling one or more of steering, braking, and/or acceleration of the autonomous vehicle to traverse through the environment.

Thus, the operations discussed herein improve prediction and provide a way for a planning system to search over possible futures.

Example Clauses

A. A system comprising: one or more processors; and one or more computer-readable media storing instructions executable by the one or more processors, wherein the instructions, when executed, cause the system to perform operations comprising: receiving sensor data of an environment captured by a sensor of an autonomous vehicle; receiving action data associated with a candidate action for the autonomous vehicle to perform in the environment, wherein the candidate action comprises one or more of a stay-in-lane action, a turn action, or a lane change action, and wherein the action data is indicative of the candidate action; generating, based at least in part on the sensor data and the action data, a multi-channel image representing a top-down view of the environment, the multi-channel image representing a bounding box associated with a vehicle in the environment proximate the autonomous vehicle, one or more of kinematic information or semantic information associated with the vehicle, and the candidate action associated with the autonomous vehicle; inputting the multi-channel image into a machine learned model trained to generate a heat map comprising a prediction probability of a possible location associated with the vehicle; determining, based at least in part on the heat map, a cost associated with the candidate action; and determining, based at least in part on the cost associated with the candidate action, a trajectory for the autonomous vehicle to travel in the environment.

B: The system of paragraph A, wherein generating the multi-channel image representing the candidate action associated with the autonomous vehicle comprises generating a channel of the multi-channel image representing a target lane in the environment associated with the candidate action, the target lane indicative of an intended lane for the autonomous vehicle to occupy.

C: The system of paragraph A or B, wherein generating the multi-channel image representing the candidate action associated with the autonomous vehicle comprises generating a channel of the multi-channel image representing a target velocity or a target acceleration of the autonomous vehicle associated with the candidate action.

D: The system of any of paragraphs A-C, wherein the prediction probability is represented as an occupancy grid associated with a future time, and wherein a cell of the occupancy grid is indicative of a probability of the vehicle being in a region associated with the cell at the future time.

E: The system of any of paragraphs A-D, wherein the candidate action is a first candidate action, wherein the heat map is a first heat map, wherein the prediction probability is a first prediction probability, and wherein the cost is a first cost, the operations further comprising: determining, based at least in part on the sensor data and a second candidate action, a second heat map comprising a second prediction probability associated with the vehicle; determining, based at least in part on the second heat map, a second cost; selecting, based at least in part on the first cost and the second cost, a selected action from the first candidate action or the second candidate action; and determining the trajectory based at least in part on the selected action.

F: A method comprising: receiving object data representing an object in an environment; receiving action data associated with a candidate action for a vehicle to perform in the environment; generating, based at least in part on the object data and the action data, a multi-channel image representing a top-down view of the environment, the multi-channel image representing the object, motion information associated with the object, and the candidate action associated with the vehicle; inputting the multi-channel image into a machine learned model; receiving, from the machine learned model, a prediction probability associated with the object; and controlling, based at least in part on the prediction probability, the vehicle to traverse the environment.

G: The method of paragraph F, wherein the prediction probability is a first prediction probability, the method further comprising, receiving, from the machine learned model, a second prediction probability associated with the vehicle.

H: The method of paragraph F or G, wherein the candidate action comprises at least one of: a stay-in-lane action; a lane change action; or a turn action; and wherein generating the multi-channel image representing the candidate action associated with the vehicle comprises generating a channel of the multi-channel image representing a target lane associated with the candidate action.

I: The method of paragraph H, wherein the channel is a first channel, and wherein generating the multi-channel image representing the candidate action associated with the vehicle further comprises generating a second channel of the multi-channel image representing a target velocity or a target acceleration of the vehicle associated with the candidate action.

J: The method of any of paragraphs F-I, wherein: the multi-channel image further comprises one or more channels comprising additional object information of additional objects in the environment; and the multi-channel image is one of a plurality of multi-channel images associated with one or more previous times prior to a current time.

K: The method of paragraph J, further comprising: receiving, from the machine learned model, a plurality of prediction probabilities representing the environment at one or more future times after the current time.

L: The method of any of paragraphs F-K, wherein the prediction probability is a first prediction probability associated with a first time after a current time, the method further comprising: receiving, from the machine learned model, a second prediction probability associated with the object, the second prediction probability associated with a second time after the first time; wherein a first probability amount associated with the first prediction probability is within a threshold amount of a second probability amount associated with the second prediction probability.

M: The method of any of paragraphs F-L, wherein the object data is based at least in part on at least one of image data, lidar data, radar data, or time-of-flight data.

N: The method of any of paragraphs F-M, wherein the machine learned model comprises a convolutional neural network.

O. The method of any of paragraphs F-N, wherein: the action data is first action data; the candidate action is a first candidate action; the multi-channel image is a first multi-channel image; the top-down view of the environment is a first top-down view of the environment; and the prediction probability is a first prediction probability associated with the first candidate action; the method further comprising: receiving second action data associated with a second candidate action for the vehicle to perform in the environment; generating, based at least in part on the object data and the second action data, a second multi-channel image representing a second top-down view of the environment; inputting the second multi-channel image into the machine learned model; and receiving, from the machine learned model, a second prediction probability associated with the object.

P. The method of paragraph O, the method further comprising: determining a first cost associated with the first prediction probability; determining, based at least in part on the second prediction probability, a second cost; selecting, as a selected action and based at least in part on the first cost and the second cost, one of the first candidate action or the second candidate action; and controlling, based at least in part on the selected action, the vehicle to traverse the environment.

Q: A non-transitory computer-readable medium storing instructions that, when executed, cause one or more processors to perform operations comprising: receiving object data representing an object in an environment; receiving action data associated with a candidate action for a vehicle to perform in the environment, wherein the candidate action comprises one or more of a stay-in-lane action, a turn action, or a lane change action, and wherein the action data is indicative of the candidate action; generating, based at least in part on the object data and the action data, a multi-channel image representing the object, motion information associated with the object, and the candidate action associated with the vehicle; inputting the multi-channel image into a machine learned model; receiving, from the machine learned model, a prediction probability associated with the object; and controlling, based at least in part on the prediction probability and the candidate action, the vehicle to traverse the environment.

R: The non-transitory computer-readable medium of paragraph Q, wherein generating the multi-channel image representing the candidate action associated with the vehicle comprises generating a channel of the multi-channel image representing a target lane associated with the candidate action, the target lane indicative of an intended lane for the vehicle to occupy.

S: The non-transitory computer-readable medium of paragraph Q or R, wherein the channel is a first channel, and wherein generating the multi-channel image representing the candidate action associated with the vehicle further comprises generating a second channel of the multi-channel image representing a target velocity or a target acceleration of the vehicle associated with the candidate action.

T: The non-transitory computer-readable medium of any of paragraphs Q-S, wherein: the action data is first action data; the candidate action is a first candidate action; the multi-channel image is a first multi-channel image; and the prediction probability is a first prediction probability associated with the first candidate action; the operations further comprising: receiving second action data associated with a second candidate action for the vehicle to perform in the environment; generating, based at least in part on the object data and the second action data, a second multi-channel image representing the object, the motion information, and the second candidate action; inputting the second multi-channel image into the machine learned model; and receiving, from the machine learned model, a second prediction probability associated with the object.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described.

The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
  one or more processors; and
  one or more computer-readable media storing instructions executable by the one or more processors, wherein the instructions, when executed, cause the system to perform operations comprising:
    receiving sensor data of an environment captured by a sensor of an autonomous vehicle;
    receiving action data associated with a candidate action for the autonomous vehicle to perform in the environment, wherein the candidate action comprises one or more of a stay-in-lane action, a turn action, or a lane change action, and wherein the action data is indicative of the candidate action;
    generating, based at least in part on the sensor data and the action data, a multi-channel image representing a top-down view of the environment, the multi-channel image representing a bounding box associated with a vehicle separate from the autonomous vehicle in the environment proximate the autonomous vehicle, one or more of kinematic information or semantic information associated with the vehicle, and the candidate action associated with the autonomous vehicle;
    inputting the multi-channel image into a machine learned model trained to generate a heat map comprising a prediction probability of a possible location associated with the vehicle;
    determining, based at least in part on the heat map, a cost associated with the candidate action; and
    determining, based at least in part on the cost associated with the candidate action, a trajectory for the autonomous vehicle to travel in the environment.

2. The system of claim 1, wherein generating the multi-channel image representing the candidate action associated with the autonomous vehicle comprises generating a channel of the multi-channel image representing a target lane in the environment associated with the candidate action, the target lane indicative of an intended lane for the autonomous vehicle to occupy.

3. The system of claim 1, wherein generating the multi-channel image representing the candidate action associated with the autonomous vehicle comprises generating a channel of the multi-channel image representing a target velocity or a target acceleration of the autonomous vehicle associated with the candidate action.

4. The system of claim 1, wherein the prediction probability is represented as an occupancy grid associated with a future time, and
  wherein a cell of the occupancy grid is indicative of a probability of the vehicle being in a region associated with the cell at the future time.

5. The system of claim 1, wherein the candidate action is a first candidate action, wherein the heat map is a first heat map, wherein the prediction probability is a first prediction probability, and wherein the cost is a first cost, the operations further comprising:

determining, based at least in part on the sensor data and a second candidate action, a second heat map comprising a second prediction probability associated with the vehicle;

determining, based at least in part on the second heat map, a second cost;

selecting, based at least in part on the first cost and the second cost, a selected action from the first candidate action or the second candidate action; and determining the trajectory based at least in part on the selected action.

6. A method comprising:

receiving object data representing an object in an environment;

receiving action data associated with a candidate action for a vehicle to perform in the environment;

generating, based at least in part on the object data and the action data, a multi-channel image representing a top-down view of the environment, the multi-channel image representing the object, motion information associated with the object, and the candidate action associated with the vehicle;

inputting the multi-channel image into a machine learned model;

receiving, from the machine learned model, a prediction probability associated with the object; and controlling, based at least in part on the prediction probability, the vehicle to traverse the environment.

7. The method of claim 6, wherein the prediction probability is a first prediction probability, the method further comprising, receiving, from the machine learned model, a second prediction probability associated with the vehicle.

8. The method of claim 6, wherein the candidate action comprises at least one of:

a stay-in-lane action;

a lane change action; or a turn action; and wherein generating the multi-channel image representing the candidate action associated with the vehicle comprises generating a channel of the multi-channel image representing a target lane associated with the candidate action.

9. The method of claim 8, wherein the channel is a first channel, and wherein generating the multi-channel image representing the candidate action associated with the vehicle further comprises generating a second channel of the multi-channel image representing a target velocity or a target acceleration of the vehicle associated with the candidate action.

10. The method of claim 6, wherein:

the multi-channel image further comprises one or more channels comprising additional object information of additional objects in the environment; and the multi-channel image is one of a plurality of multi-channel images associated with one or more previous times prior to a current time.

11. The method of claim 10, further comprising:

receiving, from the machine learned model, a plurality of prediction probabilities representing the environment at one or more future times after the current time.

12. The method of claim 6, wherein the prediction probability is a first prediction probability associated with a first time after a current time, the method further comprising:

receiving, from the machine learned model, a second prediction probability associated with the object, the second prediction probability associated with a second time after the first time;

wherein a first probability amount associated with the first prediction probability is within a threshold amount of a second probability amount associated with the second prediction probability.

13. The method of claim 6, wherein the object data is based at least in part on at least one of image data, lidar data, radar data, or time-of-flight data.

14. The method of claim 6, wherein the machine learned model comprises a convolutional neural network.

15. The method of claim 6, wherein:

the action data is first action data;

the candidate action is a first candidate action;

the multi-channel image is a first multi-channel image;

the top-down view of the environment is a first top-down view of the environment; and the prediction probability is a first prediction probability associated with the first candidate action;

the method further comprising:

receiving second action data associated with a second candidate action for the vehicle to perform in the environment;

generating, based at least in part on the object data and the second action data, a second multi-channel image representing a second top-down view of the environment;

inputting the second multi-channel image into the machine learned model; and receiving, from the machine learned model, a second prediction probability associated with the object.

16. The method of claim 15, the method further comprising:

determining a first cost associated with the first prediction probability;

determining, based at least in part on the second prediction probability, a second cost;

selecting, as a selected action and based at least in part on the first cost and the second cost, one of the first candidate action or the second candidate action; and controlling, based at least in part on the selected action, the vehicle to traverse the environment.

17. A non-transitory computer-readable medium storing instructions that, when executed, cause one or more processors to perform operations comprising:

receiving object data representing an object in an environment;

receiving action data associated with a candidate action for a vehicle to perform in the environment, wherein the candidate action comprises one or more of a stay-in-lane action, a turn action, or a lane change action, and wherein the action data is indicative of the candidate action;

generating, based at least in part on the object data and the action data, a multi-channel image representing the object, motion information associated with the object, and the candidate action associated with the vehicle;

inputting the multi-channel image into a machine learned model;

receiving, from the machine learned model, a prediction probability associated with the object; and controlling, based at least in part on the prediction probability and the candidate action, the vehicle to traverse the environment.

18. The non-transitory computer-readable medium of claim 17, wherein generating the multi-channel image representing the candidate action associated with the vehicle comprises generating a channel of the multi-channel image representing a target lane associated with the candidate action, the target lane indicative of an intended lane for the vehicle to occupy.

19. The non-transitory computer-readable medium of claim 18, wherein the channel is a first channel, and wherein generating the multi-channel image representing the candidate action associated with the vehicle further comprises generating a second channel of the multi-channel image representing a target velocity or a target acceleration of the vehicle associated with the candidate action.

20. The non-transitory computer-readable medium of claim 17, wherein:
   the action data is first action data;
   the candidate action is a first candidate action;
   the multi-channel image is a first multi-channel image; and
   the prediction probability is a first prediction probability associated with the first candidate action;
   the operations further comprising:
   receiving second action data associated with a second candidate action for the vehicle to perform in the environment;
   generating, based at least in part on the object data and the second action data, a second multi-channel image representing the object, the motion information, and the second candidate action;
   inputting the second multi-channel image into the machine learned model; and
   receiving, from the machine learned model, a second prediction probability associated with the object.

* * * * *